US012732919B2

(12) United States Patent
Yang et al.

(10) Patent No.: US 12,732,919 B2
(45) Date of Patent: Sep. 8, 2026

(54) EXTENDED LONG RANGE WIRELESS PACKET DESIGN

(71) Applicant: QUALCOMM Incorporated, San Diego, CA (US)

(72) Inventors: Lin Yang, San Diego, CA (US); Bin Tian, San Diego, CA (US); Youhan Kim, Saratoga, CA (US); Didier Johannes Richard Van Nee, Tull en 't Waal (NL); Alecsander Petru Eitan, Haifa (IL); Sameer Vermani, San Diego, CA (US); Vincent Knowles Jones, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 298 days.

(21) Appl. No.: 18/411,487

(22) Filed: Jan. 12, 2024

(65) Prior Publication Data

US 2024/0334347 A1 Oct. 3, 2024

Related U.S. Application Data

(60) Provisional application No. 63/582,774, filed on Sep. 14, 2023, provisional application No. 63/493,961, filed on Apr. 3, 2023.

(51) Int. Cl.
*H04W 52/32* (2009.01)
*H04W 52/28* (2009.01)

(52) U.S. Cl.
CPC ......... *H04W 52/325* (2013.01); *H04W 52/28* (2013.01)

(58) Field of Classification Search
CPC ... H04W 84/12; H04W 72/0453; H04W 4/80; H04W 56/001; H04W 74/0833;
(Continued)

(56) References Cited

U.S. PATENT DOCUMENTS

2012/0263141 A1 10/2012 Taghavi Nasrabadi et al.
2012/0320890 A1 12/2012 Zhang et al.
(Continued)

FOREIGN PATENT DOCUMENTS

EP 3001632 B1 3/2018
WO WO-2006138623 A2 12/2006

OTHER PUBLICATIONS

Hoefel R. P. F., "IEEE 802.11 ax (Wi-Fi 6): DL and UL MU-MIMO Channel Sounding Compression Schemes Impaired with IQ Imbalance and CFO", 2020 IEEE 91st Vehicular Technology Conference (VTC2020-Spring), IEEE, May 25, 2020, 6 Pages, XP033786956, First Column of the Fifth Page Discloses in the Paragraph Containing the Field Remarks 10, p. 5.

(Continued)

*Primary Examiner* — Ajibola A Akinyemi
(74) *Attorney, Agent, or Firm* — Holland & Hart LLP

(57) ABSTRACT

This disclosure provides methods, components, devices and systems for extended long range wireless packet design. Some aspects more specifically relate to increasing a data rate, a coverage range, or both for extended long range (ELR) wireless communications systems by updating an ELR wireless packet design. A wireless communications device, such as a wireless station (STA), may transmit an ELR wireless packet to another wireless communications device, such as a wireless access point (AP), with updated preamble fields, boosted transmit power for one or more preamble fields, and/or additional repetitions for one or more preamble fields. Additionally, or alternatively, the wireless communications device may transmit an ELR wireless packet using a narrow bandwidth to increase coverage range for an ELR wireless communications system.

25 Claims, 17 Drawing Sheets

400

(58) Field of Classification Search
CPC ............. H04W 56/0015; H04W 72/23; H04W 72/044; H04W 74/0816; H04W 52/367; H04W 56/0035; H04W 28/065; H04W 52/36; H04W 72/52; H04W 48/08; H04W 28/06; H04W 16/28
USPC .......................................................... 455/522
See application file for complete search history.

(56) References Cited

U.S. PATENT DOCUMENTS

| | | | | |
|---|---|---|---|---|
| 2016/0156438 | A1* | 6/2016 | Sun | H04L 27/2602 370/330 |
| 2017/0063670 | A1* | 3/2017 | Kim | H04L 27/2666 |
| 2017/0272976 | A1 | 9/2017 | Yang et al. | |
| 2018/0027485 | A1 | 1/2018 | Kneckt et al. | |
| 2019/0021106 | A1 | 1/2019 | Oteri et al. | |
| 2020/0177319 | A1 | 6/2020 | Cariou et al. | |
| 2021/0367886 | A1 | 11/2021 | Chen et al. | |
| 2023/0388002 | A1* | 11/2023 | Khude | H04W 52/38 |

OTHER PUBLICATIONS

International Search Report and Written Opinion—PCT/US2024/013075—ISA/EPO—Sep. 3, 2024.

Zhang J (Huawei)., et al., "HE-SIGA Transmission for Range Extension", IEEE 802.11-15/0826r2, Jul. 12, 2015, IEEE Draft, 11-15-0826-02-00AX-HE-SIG-A-TRANSMISSION-FOR- Range-Extension, IEEE-SA Mentor, Piscataway, NJ USA, vol. 802.11ax, No. 2, Sep. 14, 2015, pp. 1-23, XP068098042, p. 20.

Hoefel.R.P.F: "IEEE 802. 11 ax (Wi-Fi 6): DL and UL MU-MIMO Channel Sounding Compression Schemes Impaired with IQ Imbalance and CFO", 2020 IEEE , 91st Vehicular Technology Conference (VIC2020-Spring), IEEE, May 25, 2020, 6 Pages, XP033786956, First Column of the Fifth Page Discloses in the Paragraph Containing the Field Remarks, 10, p. 5.

Partial International Search Report—PCT/US2024/013075—ISA/EPO—May 24, 2024.

Zhang J., et al., "HE-SIGA Transmission for Range Extension", 11-15-0826-02-00AX-HE-SIG-A-Transmission-F Or-Range-Extension, IEEE-SA Mentor, Piscataway, NJ USA, vol. 802.11ax, No. 2, Sep. 14, 2015, pp. 1-23, XP068098042, p. 20.

* cited by examiner

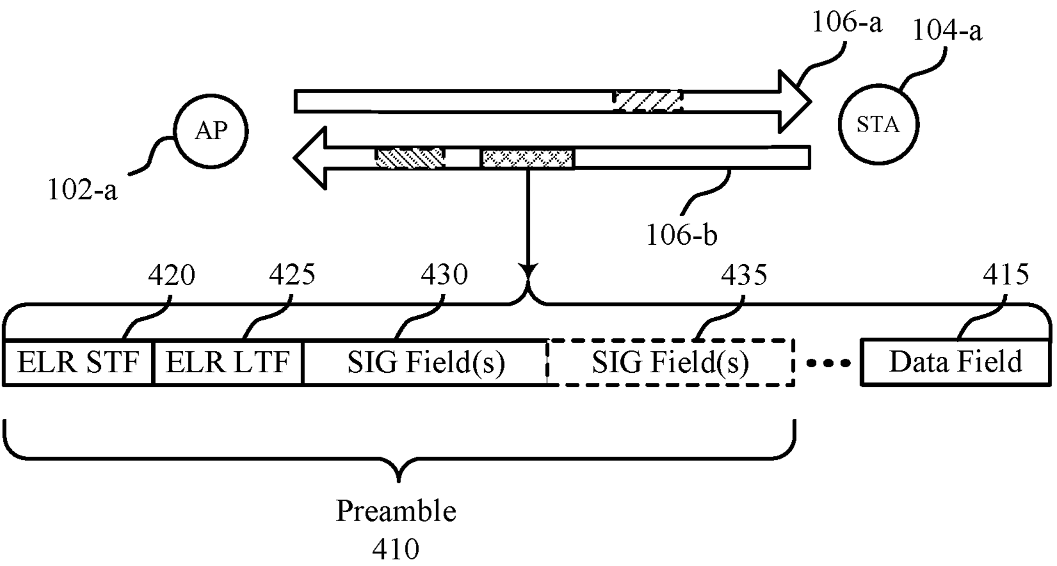
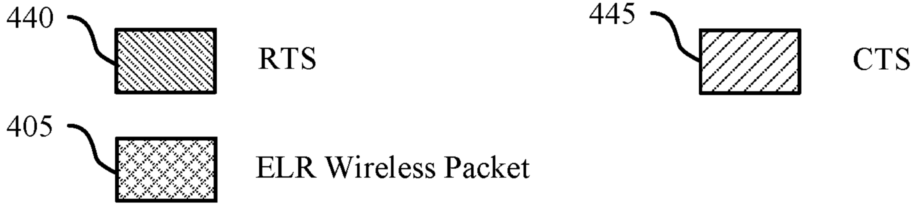
400
*Figure 4*

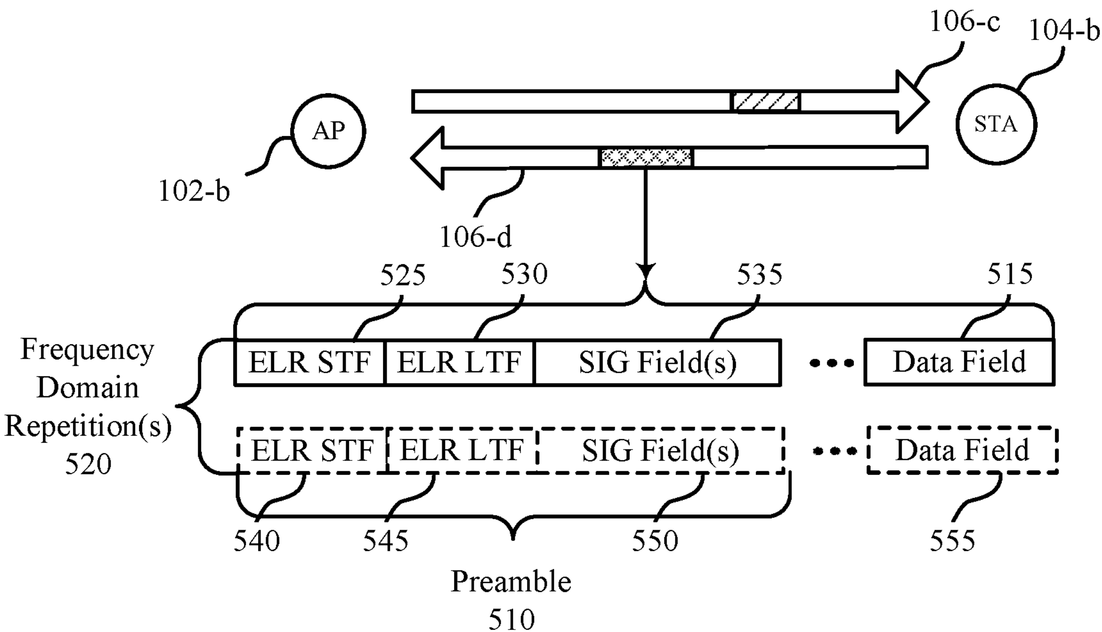
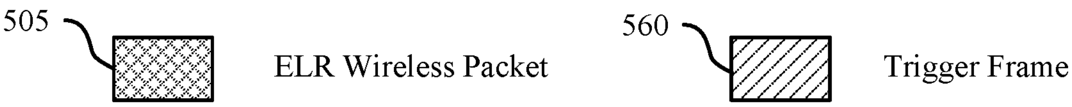
500
*Figure 5*

Figure 11:
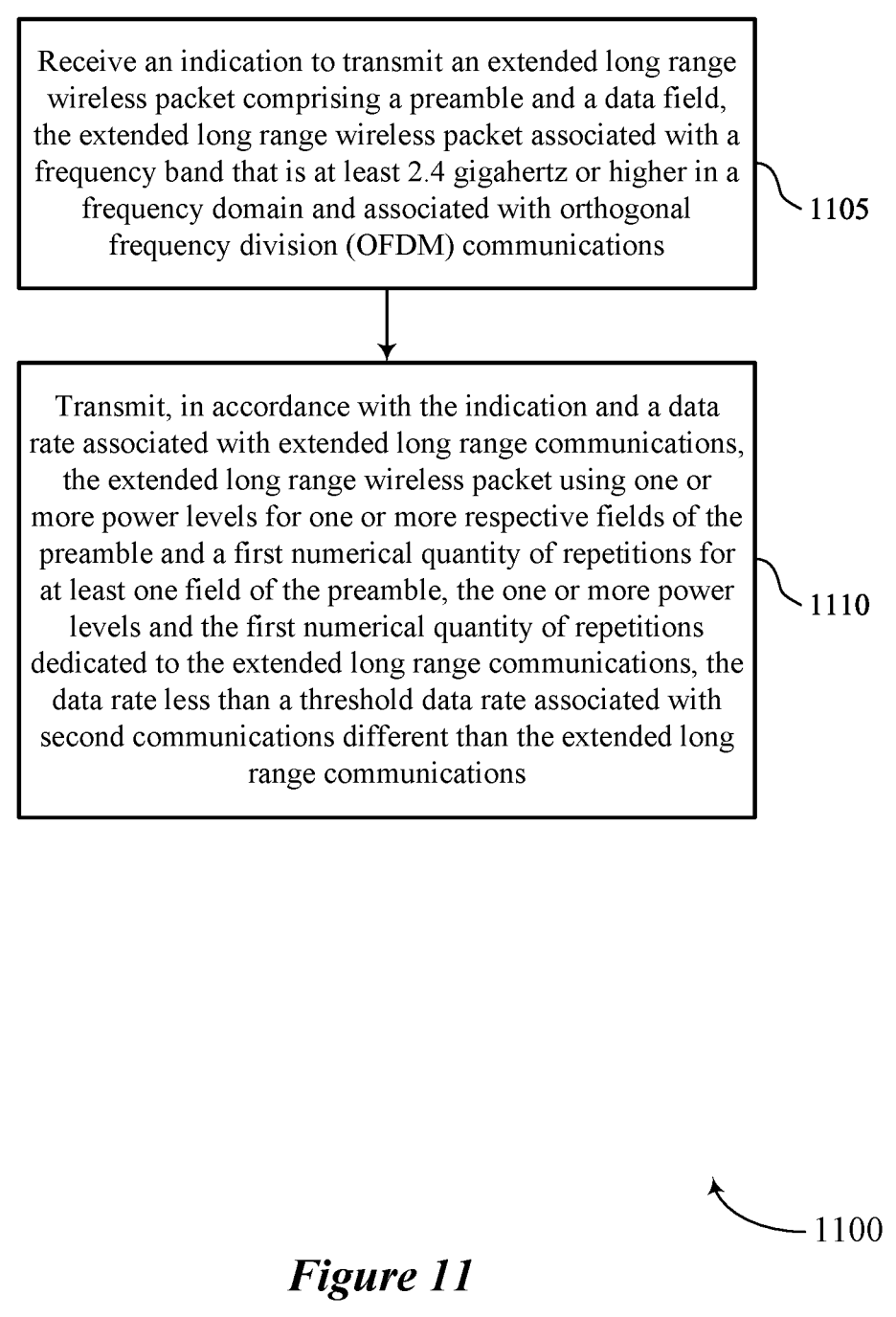

Receive an indication to transmit an extended long range wireless packet comprising a preamble and a data field, the extended long range wireless packet associated with a frequency band that is at least 2.4 gigahertz or higher in a frequency domain and associated with orthogonal frequency division (OFDM) communications

1105

Transmit, in accordance with the indication and a data rate associated with extended long range communications, the extended long range wireless packet using one or more power levels for one or more respective fields of the preamble and a first numerical quantity of repetitions for at least one field of the preamble, the one or more power levels and the first numerical quantity of repetitions dedicated to the extended long range communications, the data rate less than a threshold data rate associated with second communications different than the extended long range communications

Figure 13:
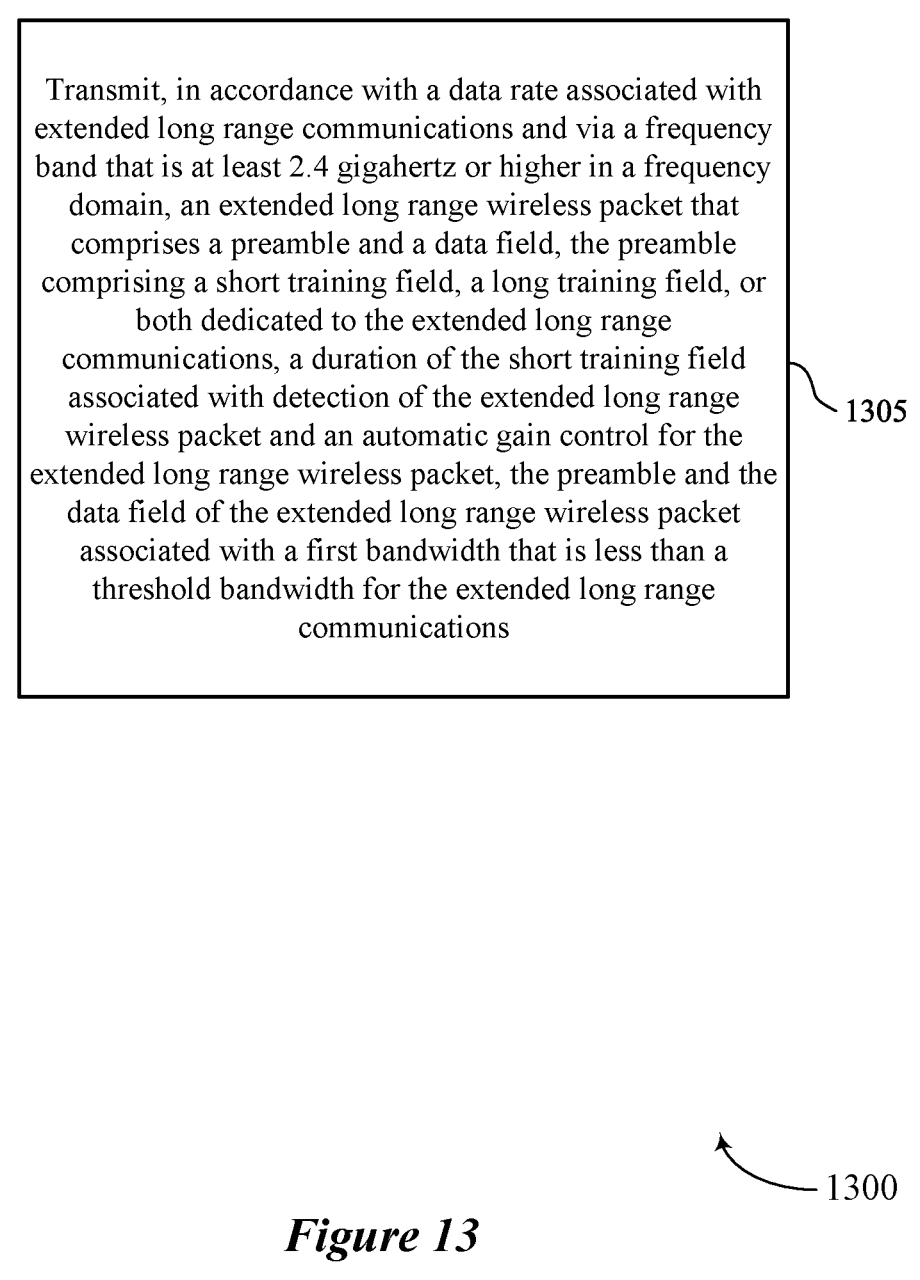

Transmit, in accordance with a data rate associated with extended long range communications and via a frequency band that is at least 2.4 gigahertz or higher in a frequency domain, an extended long range wireless packet that comprises a preamble and a data field, the preamble comprising a short training field, a long training field, or both dedicated to the extended long range communications, a duration of the short training field associated with detection of the extended long range wireless packet and an automatic gain control for the extended long range wireless packet, the preamble and the data field of the extended long range wireless packet associated with a first bandwidth that is less than a threshold bandwidth for the extended long range communications

Figure 14:
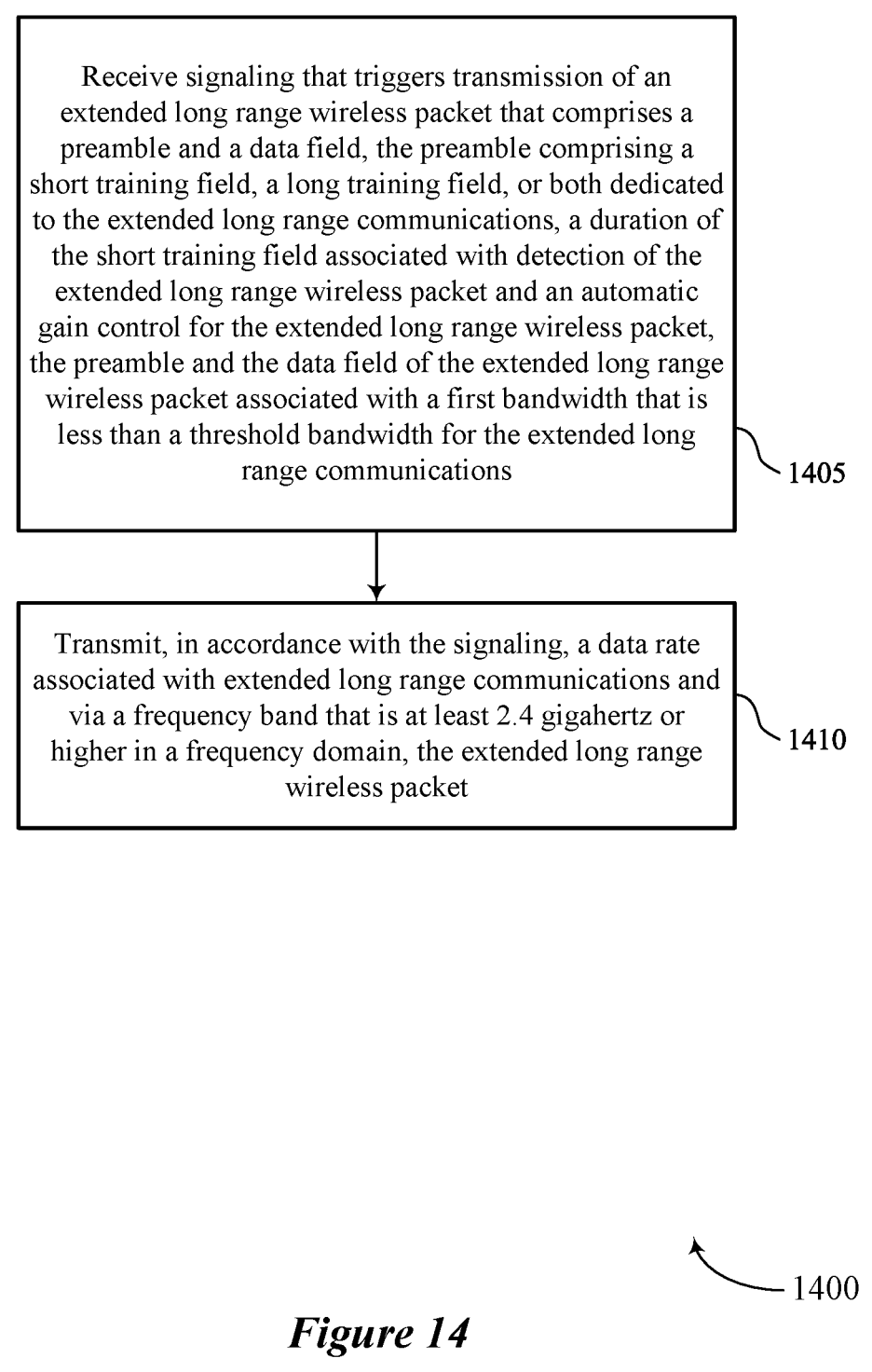

Receive signaling that triggers transmission of an extended long range wireless packet that comprises a preamble and a data field, the preamble comprising a short training field, a long training field, or both dedicated to the extended long range communications, a duration of the short training field associated with detection of the extended long range wireless packet and an automatic gain control for the extended long range wireless packet, the preamble and the data field of the extended long range wireless packet associated with a first bandwidth that is less than a threshold bandwidth for the extended long range communications

1405

Transmit, in accordance with the signaling, a data rate associated with extended long range communications and via a frequency band that is at least 2.4 gigahertz or higher in a frequency domain, the extended long range wireless packet

Figure 16:
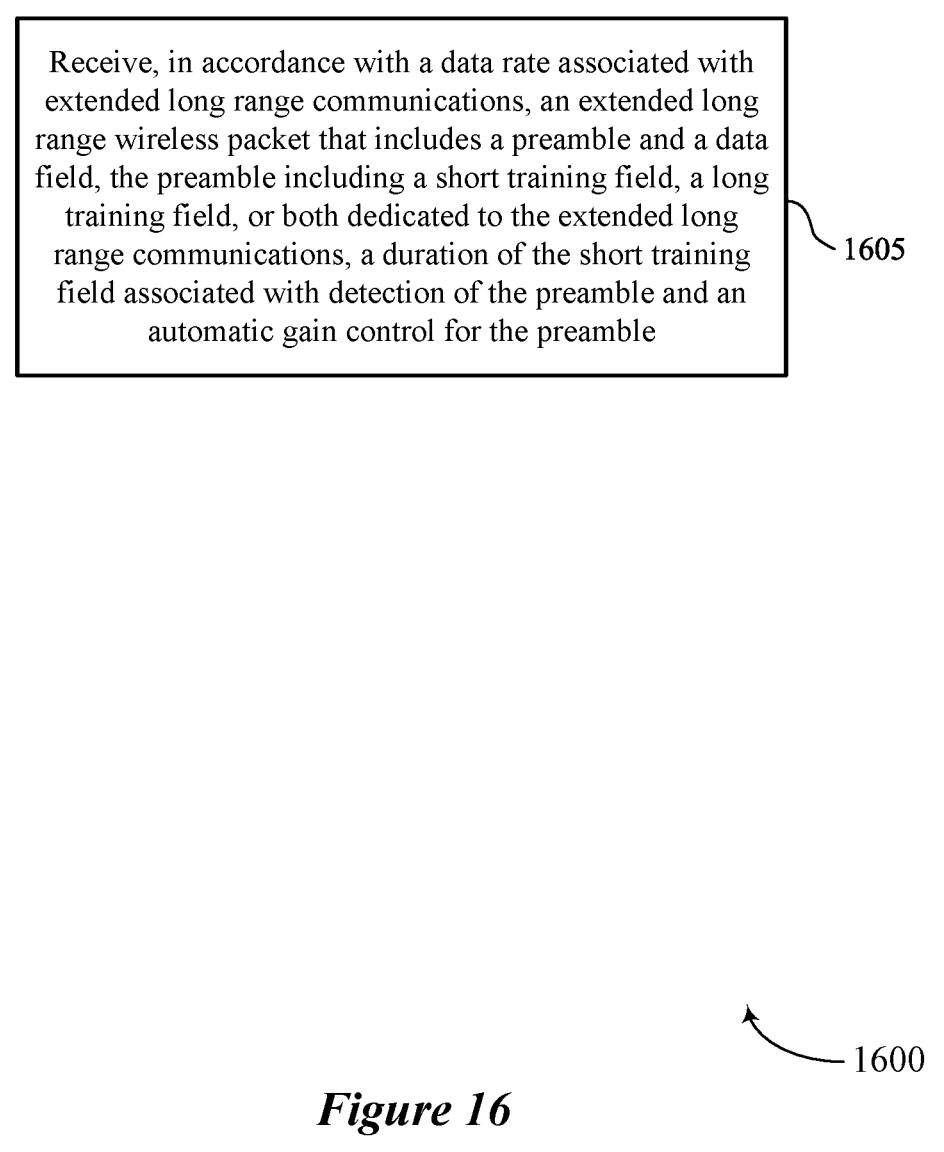

Receive, in accordance with a data rate associated with extended long range communications, an extended long range wireless packet that includes a preamble and a data field, the preamble including a short training field, a long training field, or both dedicated to the extended long range communications, a duration of the short training field associated with detection of the preamble and an automatic gain control for the preamble

Figure 17:
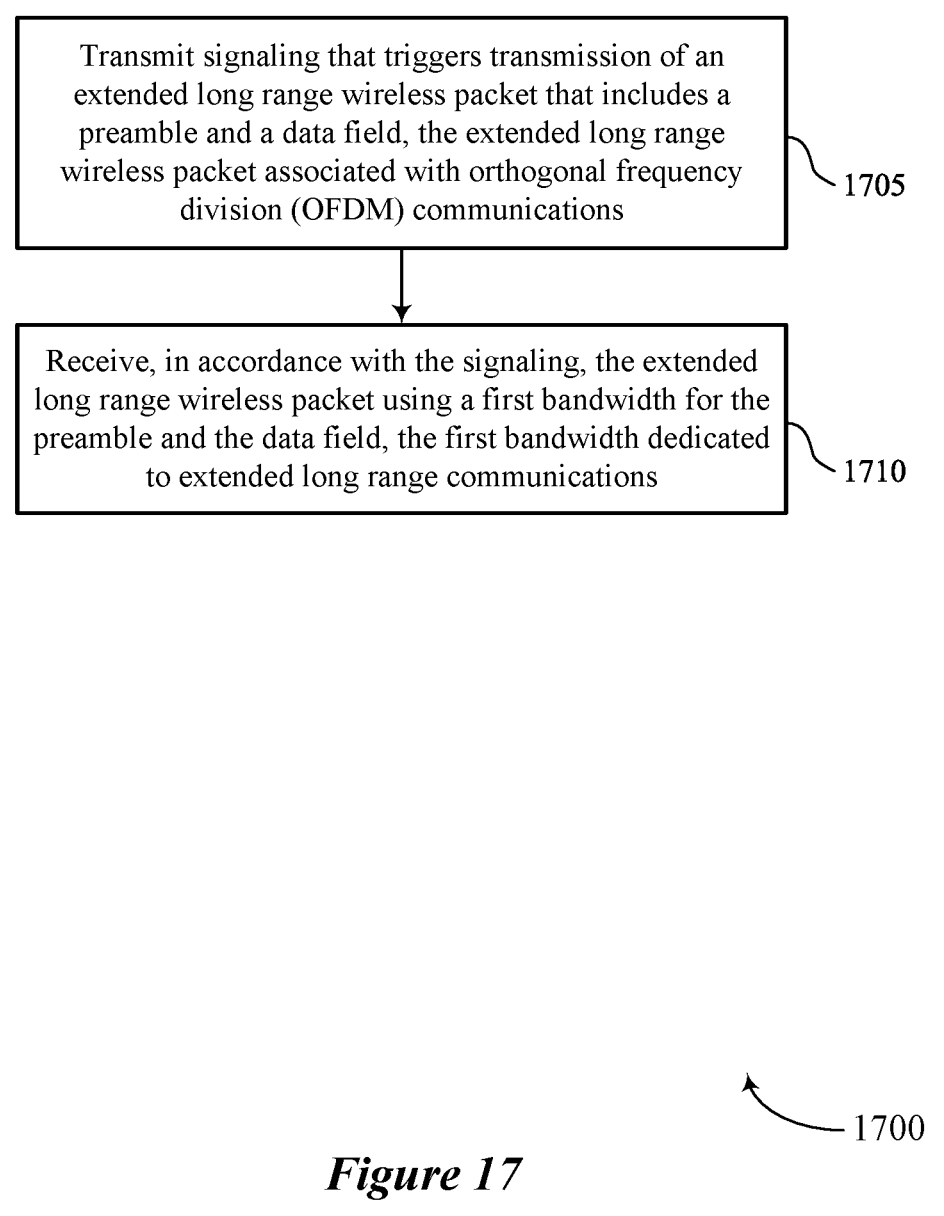

Transmit signaling that triggers transmission of an extended long range wireless packet that includes a preamble and a data field, the extended long range wireless packet associated with orthogonal frequency division (OFDM) communications

1705

Receive, in accordance with the signaling, the extended long range wireless packet using a first bandwidth for the preamble and the data field, the first bandwidth dedicated to extended long range communications

EXTENDED LONG RANGE WIRELESS PACKET DESIGN

CROSS REFERENCE

The present Application for Patent claims the benefit of U.S. Provisional Patent Application No. 63/493,961 by YANG et al., entitled "EXTENDED LONG RANGE WIRELESS PACKET DESIGN," filed Apr. 3, 2023, and of U.S. Provisional Patent Application No. 63/582,774 by YANG et al., entitled "EXTENDED LONG RANGE WIRELESS PACKET DESIGN," filed Sep. 14, 2023, each of which are assigned to the assignee hereof, and are expressly incorporated by reference herein.

TECHNICAL FIELD

This disclosure relates to wireless communication and, more specifically, to extended long range (ELR) wireless packet design.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In some WLANs, one or more wireless devices, such as wireless STAs and/or wireless APs, may extend a distance, or coverage range, over which wireless coverage is provided. For example, the wireless devices may operate using a 2.4 gigahertz (GHz) frequency band rather than a 5 GHz or 6 GHz frequency band, because the 2.4 GHz band uses longer waves, which improves coverage range and provides improved transmission through objects. Such wireless communications systems may be referred to as long range (LR) wireless communications systems.

SUMMARY

The systems, methods, and devices of this disclosure each have several innovative aspects, no single one of which is solely responsible for the desirable attributes disclosed herein.

A method for wireless communication by a wireless station (STA) is described. The method may include receiving an indication to transmit an extended long range (ELR) wireless packet including a preamble and a data field, the ELR wireless packet associated with a frequency band that is at least 2.4 gigahertz (GHz) or higher in a frequency domain and associated with orthogonal frequency division (OFDM) communications and transmitting, in accordance with the indication and a data rate associated with ELR communications, the ELR wireless packet using one or more power levels for one or more respective fields of the preamble and a first numerical quantity of repetitions for at least one field of the preamble, the one or more power levels and the first numerical quantity of repetitions dedicated to the ELR communications, the data rate less than a threshold data rate associated with second communications different than the ELR communications.

An apparatus for wireless communication at a wireless STA is described. The apparatus may include a processing system that includes one or more processors and one or more memories coupled with the one or more processors. The processing system may be configured to cause the apparatus to receive an indication to transmit an ELR wireless packet including a preamble and a data field, the ELR wireless packet associated with a frequency band that is at least 2.4 GHz or higher in a frequency domain and associated with OFDM communications and transmit, in accordance with the indication and a data rate associated with ELR communications, the ELR wireless packet using one or more power levels for one or more respective fields of the preamble and a first numerical quantity of repetitions for at least one field of the preamble, the one or more power levels and the first numerical quantity of repetitions dedicated to the ELR communications, the data rate less than a threshold data rate associated with second communications different than the ELR communications.

Another wireless STA for wireless communication is described. The wireless STA may include means for receiving an indication to transmit an ELR wireless packet including a preamble and a data field, the ELR wireless packet associated with a frequency band that is at least 2.4 GHz or higher in a frequency domain and associated with OFDM communications and means for transmitting, in accordance with the indication and a data rate associated with ELR communications, the ELR wireless packet using one or more power levels for one or more respective fields of the preamble and a first numerical quantity of repetitions for at least one field of the preamble, the one or more power levels and the first numerical quantity of repetitions dedicated to the ELR communications, the data rate less than a threshold data rate associated with second communications different than the ELR communications.

A non-transitory computer-readable medium storing code for wireless communication is described. The code may include instructions executable by a processor to receive an indication to transmit an ELR wireless packet including a preamble and a data field, the ELR wireless packet associated with a frequency band that is at least 2.4 GHz or higher in a frequency domain and associated with OFDM communications and transmit, in accordance with the indication and a data rate associated with ELR communications, the ELR wireless packet using one or more power levels for one or more respective fields of the preamble and a first numerical quantity of repetitions for at least one field of the preamble, the one or more power levels and the first numerical quantity of repetitions dedicated to the ELR communications, the data rate less than a threshold data rate associated with second communications different than the ELR communications.

Some examples of the method, wireless STAs, and non-transitory computer-readable medium described herein may further include operations, features, means, or instructions for transmitting a request to transmit the ELR wireless packet, the indication being received in response to transmitting the request.

Some examples of the method, wireless STAs, and non-transitory computer-readable medium described herein may further include operations, features, means, or instructions for transmitting a request to transmit the ELR wireless packet, a duration of the request associated at least in part with the ELR communications and receiving the indication in response to the request, the indication including a trigger frame that indicates protection for the ELR wireless packet, the ELR wireless packet including a trigger-based transmission associated at least in part with the trigger frame.

Some examples of the method, wireless STAs, and non-transitory computer-readable medium described herein may further include operations, features, means, or instructions for transmitting, via the request to transmit the ELR wireless packet, an identifier of the wireless STA, information associated with a basic service set, a duration for the protection for the ELR wireless packet, or any combination thereof.

Some examples of the method, wireless STAs, and non-transitory computer-readable medium described herein may further include operations, features, means, or instructions for transmitting the request via a wireless packet including at least a short training field (STF), a long training field (LTF), and a signal (SIG) field.

Some examples of the method, wireless STAs, and non-transitory computer-readable medium described herein may further include operations, features, means, or instructions for applying a carrier frequency offset (CFO) to the at least one field of the preamble, the CFO associated at least in part with the indication.

Some examples of the method, wireless STAs, and non-transitory computer-readable medium described herein may further include operations, features, means, or instructions for transmitting, via the at least one field of the preamble, a signature sequence, the signature sequence associated at least in part with the indication.

In some examples of the method, wireless STAs, and non-transitory computer-readable medium described herein, the first numerical quantity of repetitions for the at least one field of the preamble may be at least four repetitions, the at least one field including a SIG field.

In some examples of the method, wireless STAs, and non-transitory computer-readable medium described herein, each repetitions of the at least four repetitions includes a subset of a set of bits associated at least in part with an indication of the ELR communications.

Some examples of the method, wireless STAs, and non-transitory computer-readable medium described herein may further include operations, features, means, or instructions for transmitting the data field in accordance with a second numerical quantity of repetitions, an interleaving parameter, a code rate, a modulation scheme, or any combination thereof, the second numerical quantity of repetitions, the interleaving parameter, the code rate, and the modulation scheme associated with the data rate.

In some examples of the method, wireless STAs, and non-transitory computer-readable medium described herein, the modulation scheme includes a modulation and coding scheme 0 (MCS0) and the second numerical quantity of repetitions includes four repetitions or the second numerical quantity of repetitions includes three repetitions.

Some examples of the method, wireless STAs, and non-transitory computer-readable medium described herein may further include operations, features, means, or instructions for boosting the one or more power levels in accordance with a threshold power level value for the data rate corresponding to the ELR communications.

In some examples of the method, wireless STAs, and non-transitory computer-readable medium described herein, the one or more respective fields include an STF, an LTF, or both.

In some examples of the method, wireless STAs, and non-transitory computer-readable medium described herein, the at least one field includes one or more signal fields that indicate whether the ELR wireless packet may be for a single user or not, coding information, a length of the ELR wireless packet, a modulation and coding scheme (MCS), a bandwidth size, a resource unit size, or any combination thereof.

A method for wireless communication by a STA is described. The method may include transmitting, in accordance with a data rate associated with ELR communications and via a frequency band that is at least 2.4 GHz or higher in a frequency domain, an ELR wireless packet that includes a preamble and a data field, the preamble including an STF, an LTF, or both dedicated to the ELR communications, a duration of the STF associated with detection of the ELR wireless packet and an automatic gain control (AGC) for the ELR wireless packet, the preamble and the data field of the ELR wireless packet associated with a first bandwidth that is less than a threshold bandwidth for the ELR communications.

An apparatus for wireless communication at a wireless STA is described. The apparatus may include a processing system that includes one or more processors and one or more memories coupled with the one or more processors. The processing system may be configured to cause the apparatus to transmit, in accordance with a data rate associated with ELR communications and via a frequency band that is at least 2.4 GHz or higher in a frequency domain, an ELR wireless packet that includes a preamble and a data field, the preamble including an STF, an LTF, or both dedicated to the ELR communications, a duration of the STF associated with detection of the ELR wireless packet and an AGC for the ELR wireless packet, the preamble and the data field of the ELR wireless packet associated with a first bandwidth that is less than a threshold bandwidth for the ELR communications.

Another STA for wireless communication is described. The STA may include means for transmitting, in accordance with a data rate associated with ELR communications and via a frequency band that is at least 2.4 GHz or higher in a frequency domain, an ELR wireless packet that includes a preamble and a data field, the preamble including an STF, an LTF, or both dedicated to the ELR communications, a duration of the STF associated with detection of the ELR wireless packet and an AGC for the ELR wireless packet, the preamble and the data field of the ELR wireless packet associated with a first bandwidth that is less than a threshold bandwidth for the ELR communications.

A non-transitory computer-readable medium storing code for wireless communication is described. The code may include instructions executable by a processor to transmit, in accordance with a data rate associated with ELR communications and via a frequency band that is at least 2.4 GHz or higher in a frequency domain, an ELR wireless packet that includes a preamble and a data field, the preamble including an STF, an LTF, or both dedicated to the ELR communications, a duration of the STF associated with detection of the ELR wireless packet and an AGC for the ELR wireless packet, the preamble and the data field of the ELR wireless packet associated with a first bandwidth that is less than a threshold bandwidth for the ELR communications.

Some examples of the method, STAs, and non-transitory computer-readable medium described herein may further include operations, features, means, or instructions for transmitting the STF, the LTF, or both in accordance with respective boosted power levels, the respective boosted power levels associated with a threshold power level value for the data rate.

Some examples of the method, STAs, and non-transitory computer-readable medium described herein may further include operations, features, means, or instructions for receiving signaling that triggers transmission of the ELR wireless packet, the ELR wireless packet transmitted in accordance with the signaling.

Some examples of the method, STAs, and non-transitory computer-readable medium described herein may further include operations, features, means, or instructions for transmitting the ELR wireless packet in accordance with a downclocking ratio that downclocks a bandwidth of the ELR wireless packet from a second bandwidth to the first bandwidth.

In some examples of the method, STAs, and non-transitory computer-readable medium described herein, the ELR wireless packet may be associated with OFDM communications and the OFDM communications include a set of multiple ELR wireless packets including the ELR wireless packet in accordance with the set of multiple ELR wireless packets being associated with the downclocking ratio.

Some examples of the method, STAs, and non-transitory computer-readable medium described herein may further include operations, features, means, or instructions for transmitting the ELR wireless packet in accordance with a numerical quantity of repetitions in frequency associated with a target coverage range corresponding to the ELR communications.

Some examples of the method, STAs, and non-transitory computer-readable medium described herein may further include operations, features, means, or instructions for selecting the downclocking ratio in accordance with a CFO correction value satisfying a threshold CFO correction value, a range gain value satisfying a threshold range gain value, or both.

Some examples of the method, STAs, and non-transitory computer-readable medium described herein may further include operations, features, means, or instructions for transmitting the preamble in accordance with an increased frequency spacing between one or more resources of at least one field of one or more fields of the preamble in accordance with a CFO correction value failing to satisfy a threshold carrier frequency offset correction value.

Some examples of the method, STAs, and non-transitory computer-readable medium described herein may further include operations, features, means, or instructions for selecting the first bandwidth for the data field in accordance with a resource unit size corresponding to the preamble and the data field.

In some examples of the method, STAs, and non-transitory computer-readable medium described herein, the ELR wireless packet may be associated with OFDM communications and the OFDM communications include the ELR wireless packet and a set of multiple wireless packets in accordance with the resource unit size and a tone plan associated with the ELR wireless packet and the set of multiple wireless packets.

In some examples of the method, STAs, and non-transitory computer-readable medium described herein, one or more fields of the preamble may be repeated in accordance with a tone plan and a duration in accordance with the resource unit size, the tone plan associated with one or more resource indices for repetitions of the one or more fields of the preamble.

In some examples of the method, STAs, and non-transitory computer-readable medium described herein, the preamble includes an STF dedicated to the ELR communications, a tone spacing associated with the STF associated at least in part with the ELR communications.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 4 shows an example of a signaling diagram that supports techniques for extended long range (ELR) wireless packet transmission in accordance with ELR wireless packet design.

FIG. 5 shows an example of a signaling diagram that supports ELR wireless packet transmission in accordance with a narrow bandwidth ELR wireless packet design.

FIGS. 11-17 show flowcharts illustrating example processes that support ELR wireless packet design.

Like reference numbers and designations in the various drawings indicate like elements.

DETAILED DESCRIPTION

Figure 1:
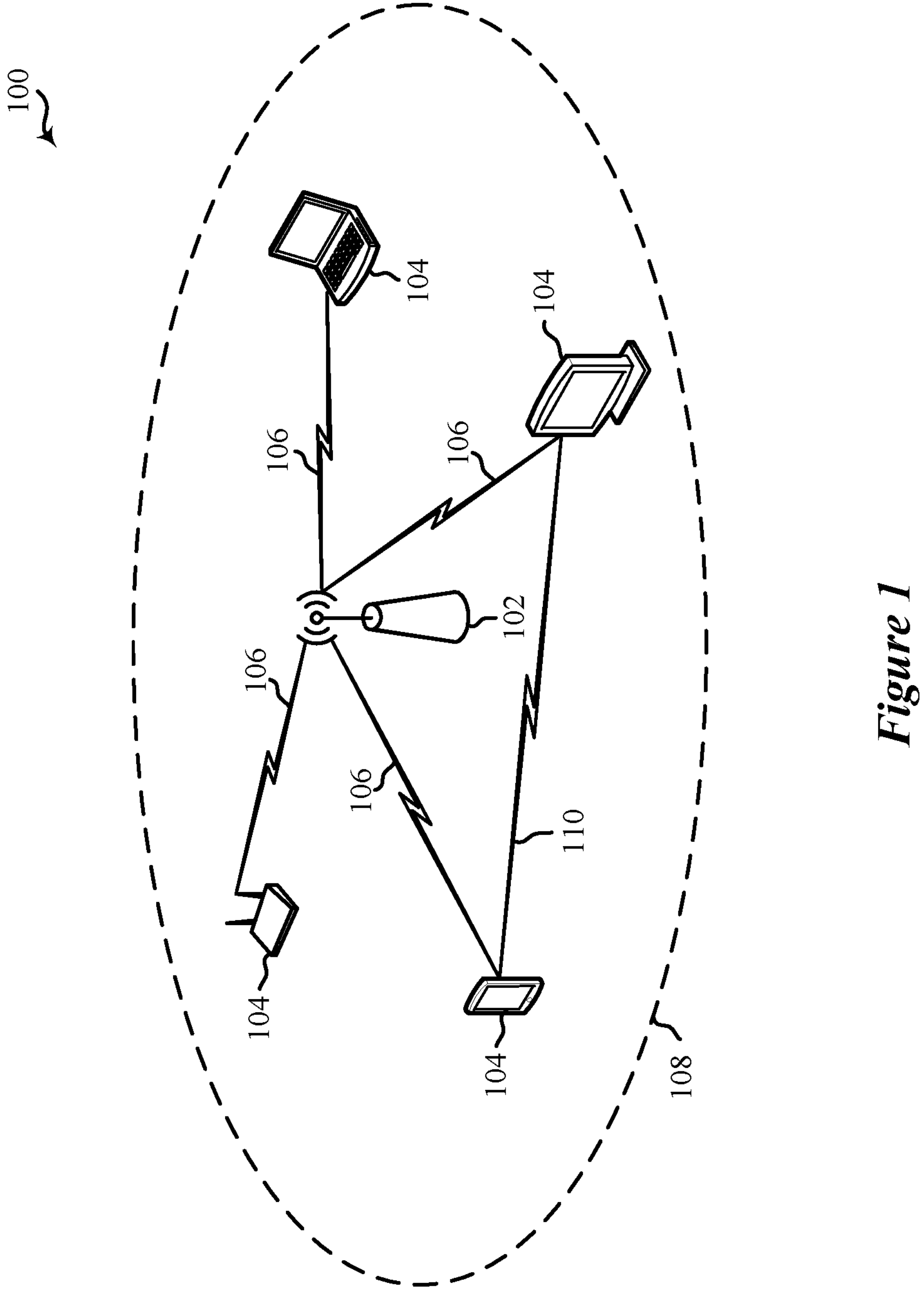
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IOT) network.

Various aspects relate generally to wireless communications. Some aspects more specifically relate to extended long range wireless packet design. In some implementations, one or more wireless devices, such as wireless stations (STAs), wireless access points (APs), or both in a WLAN communications system, may extend a distance, or coverage range, over which wireless communication is provided. For example, the wireless devices may operate using a 2.4 gigahertz (GHz) frequency band rather than a 5 GHz or 6 GHz frequency band, because the 2.4 GHz band uses longer waves, which improves range and provides improved transmission through objects. Such wireless communications systems may be referred to as long range (LR) wireless communications systems. The existing LR wireless packet design may cover single carrier-based LR mods in a 2.4 GHz frequency band (for example, 802.11b wireless communication protocols), an extended range (ER) single user mode (for example, an orthogonal frequency division multiplexed (OFDM)-based ER mode, or 802.11ax wireless communication protocols), or both. The LR wireless communications systems may be outdoor IoT networks and indoor networks with longer range conditions. The wireless communications devices may be wireless video doorbells, outdoor surveillance cameras, wireless garage door controllers, outdoor sprinkler controllers, wireless speakers, smart appliances, security IoT devices, or any combination thereof. However, one or more wireless devices may still be outside of this long range. Further, the data rate of the communications in the LR wireless communications system may be relatively low due to slower transmission time using longer waves, which may cause latency and relatively low throughput when compared with a system that uses a higher frequency band.

As described herein, one or more wireless communications devices may improve the data rate, the range, or both for LR wireless communications systems, which may correspondingly be referred to as extended long range (ELR) systems. The wireless communications devices may implement an ELR wireless packet design to obtain a target data rate while maintaining an existing coverage range for a LR wireless communications system, where the coverage range is the geographical area that the wireless communications devices may transmit and receive signaling. Additionally, or alternatively, the wireless communications device may implement an ELR wireless packet design to extend a coverage range while maintaining a similar, or slightly lower, data rate when compared with an existing coverage range for the LR wireless communications system. In some implementations, the wireless communications device may implement an ELR wireless packet design to extend a coverage range and reduce an uplink and downlink power imbalance due to, for example, one or more regulations and/or hardware differences at uplink and downlink devices.

A wireless communications device, such as a wireless STA, may transmit an ELR wireless packet to another wireless communications device, such as an AP, via a frequency band that is at least 2.4 GHz or higher in a frequency domain and with orthogonal frequency division multiplexed (OFDM) wireless packet design, boosted transmit power for one or more preamble fields, and/or additional repetitions for one or more preamble fields. In some implementations, the wireless communications device may transmit an ELR wireless packet upon transmission and receipt of request to send (RTS) and clear to send (CTS) signaling in accordance with an existing LR protocol or ELR packet protection protocol, where the ELR wireless packet may be referred to as a non-standalone ELR wireless packet. In some other implementations, the wireless communications device may transmit an updated ELR wireless packet without RTS and CTS signaling or ELR packet protection protocol, which may be referred to as a standalone ELR wireless packet. The standalone ELR wireless packet may include new or modified preamble fields and, such as a short training field (STF) with a greater duration, a different base sequence than for existing OFDM based protocol, or both, long training field (LTF) repetitions, and a simplified signal field (SIG). To improve data rate and efficiency for the LR system, the wireless communications device may transmit the ELR wireless packet using a boosted transmit power of the STF, LTF, or both and/or may repeat the SIG fields, LTF, or both for the standalone or non-standalone ELR wireless packet.

Additionally, or alternatively, the wireless communications device may transmit an ELR wireless packet using a narrow bandwidth to increase coverage range for an LR system. In some implementations, the wireless communications device may use a downclocking ratio to downclock a transmit bandwidth from a relatively high bandwidth to a relatively low bandwidth, where the lower bandwidth has a lower noise floor thus higher SNR and correspondingly increases transmission range. In some implementations, the wireless communications device may transmit a relatively narrow bandwidth ELR wireless packet based on a relatively small resource unit size (referred to as RU-based ELR). For example, a bandwidth of a preamble of the ELR wireless packet may be the same as a resource unit bandwidth for a data field. Further, the wireless communications device may duplicate the ELR wireless packet in the frequency domain to improve communication reliability related to communication errors.

Particular aspects of the subject matter described in this disclosure can be implemented to realize one or more of the following potential advantages. In some implementations, a wireless communications device may increase signaling throughput and efficiency for an LR wireless communications system while maintaining a coverage range of the LR wireless communications system by updating an ELR wireless packet design, where the ELR wireless packet includes a preamble with one or more fields and a data field. Specifically, the wireless communications device may boost the transmit power for preamble fields, repeat one or more preamble fields, simplify one or more preamble fields, or any combination thereof to increase signaling throughput or improve signaling accuracy, thereby improving signaling efficiency for the LR wireless communications system by reducing decoding errors and unnecessary retransmissions.

In some other implementations the wireless communications device may increase a coverage range of the LR wireless communications system by updating an ELR wireless packet design. Specifically, the wireless communications device may transmit the ELR wireless packet using a narrow bandwidth, which may have a lower noise floor thus higher SNR, thereby extending the coverage range of the LR wireless communications system. Further, the wireless communications device may improve reliability of the transmission by repeating the ELR wireless packet transmission in the frequency domain, which may provide for improved decodability and fewer retransmissions.

FIG. 1 shows a pictorial diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11be, 802.11bf, and 802.11bn). The WLAN 100 may include numerous wireless communication devices such as a wireless AP 102 and multiple wireless STAs. While only one AP 102 is shown in FIG. 1, the WLAN 100 also can include multiple APs 102. AP 102 shown in FIG. 1 can represent various different types of APs including but not limited to enterprise-level APs, single-frequency APs, dual-band APs, standalone APs, software-enabled APs (soft APs), and multi-link APs. The coverage area and capacity of a cellular network (such as LTE, 5G NR, etc.) can be further improved by a small cell which is supported by an AP 102 serving as a miniature base station. Furthermore, private cellular networks also can be set up through a wireless area network using small cells.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, chromebooks, extended reality (XR) headsets, wearable devices, display devices (for example, TVs (including smart TVs), computer monitors, navigation systems, among others), music or other audio or stereo devices, remote control devices ("remotes"), printers, kitchen appliances (including smart refrigerators) or other household appliances, key fobs (for example, for passive keyless entry and start (PKES) systems), Internet of Things (IoT) devices, and vehicles, among other examples. The various STAs 104 in the network are able to communicate with one another via the AP 102.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified or indicated to users by a service set identifier (SSID), as well as to other devices by a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some implementations, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some implementations, ad hoc networks may be implemented within a larger wireless network such as the WLAN 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to one or more of the IEEE 802.11 family of wireless communication protocol standards. These standards define the WLAN radio and baseband protocols for the PHY and MAC layers. The APs 102 and STAs 104 transmit and receive wireless communications (hereinafter also referred to as "Wi-Fi communications" or "wireless packets") to and from one another in the form of PHY protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MegaHertz (MHz) band. Some examples of the APs 102 and STAs 104 described herein also may communicate in other frequency bands, such as the 5.9 GHz and the 6 GHz bands, which may support both licensed and unlicensed communications. The APs 102 and STAs 104 also can communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax, 802.11be and 802.11bn standard amendments may be transmitted over the 2.4 GHz, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MH2, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload.

In some examples, the AP 102 or the STAs 104 of the WLAN 100 may implement ELR or ultra-high reliability (UHR) or other communication features compliant with current and future generations of the IEEE 802.11 family of wireless communication protocol standards (such as the IEEE 802.11be and 802.11bn standard amendments) to provide additional capabilities over other previous systems (for example, LR systems or other legacy systems).

A wireless STA 104 may transmit an ELR wireless packet to an AP 102 with an existing LR or extended range (ER) wireless packet design, but with updated preamble fields, boosted transmit power for one or more preamble fields, and/or additional repetitions for one or more preamble fields. The existing LR wireless packet design may cover single carrier-based LR mods in a 2.4 GHz frequency band (for example, 802.11b wireless communication protocols), an ER single user mode (for example, an OFDM-based ER mode, or 802.11ax wireless communication protocols), or both. The updated preamble fields, boosted transmit power, and additional repetitions described herein may be applied to the ER single user PPDU or an OFDM packet format. It is to be understood that LR as used herein may refer to only the OFDM-based ER mode, in some implementations. Additionally, LR may refer to the ER single user mode, or to both modes. In some implementations, the wireless STA 104 may transmit an ELR wireless packet upon transmission and receipt of RTS and CTS signaling in accordance with an existing LR protocol (for example, an existing 802.11b wireless communication protocol, or some other LR protocol) or ELR packet protection protocol, where the ELR wireless packet may be referred to as a non-standalone ELR wireless packet. In some other implementations, the wireless communications device may transmit an updated ELR wireless packet without RTS and CTS signaling or ELR packet protection protocol, which may be referred to as a standalone ELR wireless packet. The standalone ELR wireless packet may include new or modified preamble fields and, such as an STF with a greater duration, a different base sequence than for existing LR protocol, or both, LTF repetitions, and a simplified SIG field. To improve data rate and efficiency for the LR system, the wireless STA 104 may transmit the ELR wireless packet using a boosted transmit power of the STF, LTF, or both and/or may repeat the SIG fields, LTF, or both for the standalone or non-standalone ELR wireless packet.

Additionally, or alternatively, the wireless STA 104 may transmit an ELR wireless packet using a narrow bandwidth to increase coverage range for an LR system. In some implementations, the wireless STA 104 may use a downclocking ratio to downclock a transmit bandwidth from a relatively high bandwidth to a relatively low bandwidth, where the lower bandwidth has a lower noise floor thus higher SNR and correspondingly increases transmission range. Further, the wireless STA 104 may duplicate the ELR wireless packet in the frequency domain to improve communication reliability related to communication errors.

Figure 2:
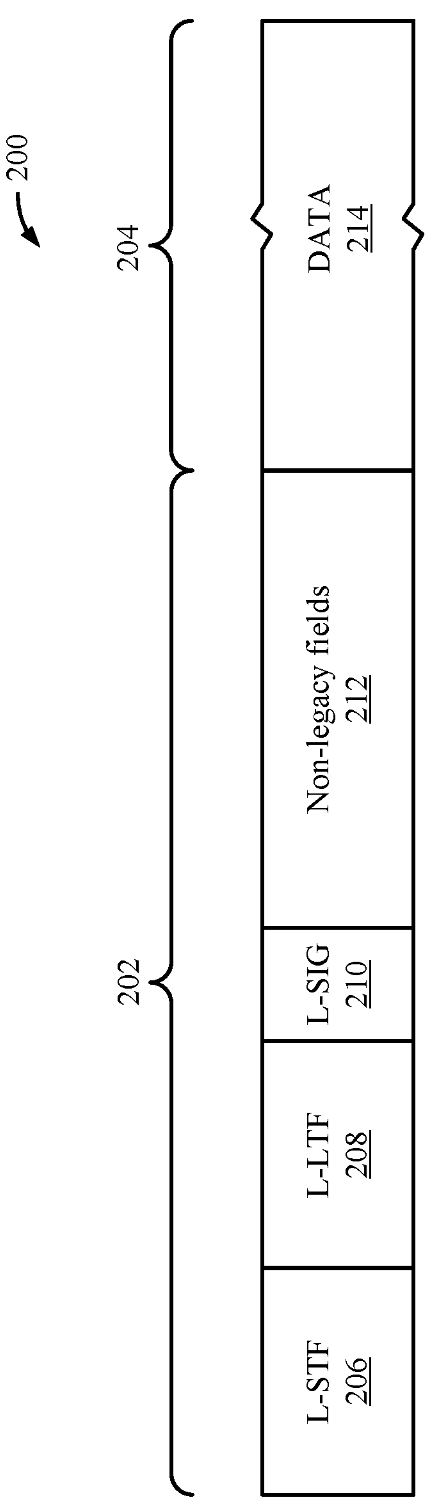
FIG. 2 shows an example protocol data unit (PDU) usable for communications between a wireless access point (AP) and one or more wireless stations (STAs).

FIG. 2 shows an example protocol data unit (PDU) 200 usable for wireless communication between a wireless AP 102 and one or more wireless STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two symbols, a legacy long training field (L-LTF) 208, which may consist of two symbols, and a legacy signal field (L-SIG) 210, which may consist of one symbol. The legacy portion of the preamble 202 may be configured according to the IEEE 802.11a wireless communication protocol standard. The preamble 202 also may include a non-legacy portion including one or more non-legacy fields 212, for example, conforming to one or more of the IEEE 802.11 family of wireless communication protocol standards.

The L-STF 206 generally enables a receiving device to perform coarse timing and frequency tracking and automatic gain control (AGC). The L-LTF 208 generally enables a receiving device to perform fine timing and frequency tracking and also to perform an initial estimate of the wireless channel. The L-SIG 210 generally enables a receiving device to determine (for example, obtain, select, identify, detect, ascertain, calculate, or compute) a duration of the PDU and to use the determined duration to avoid transmitting on top of the PDU. The legacy portion of the preamble, including the L-STF 206, the L-LTF 208 and the L-SIG 210, may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of MAC protocol data units (MPDUs) or an aggregated MPDU (A-MPDU).

A wireless STA 104 may transmit an ELR wireless packet to an AP 102 with an existing PPDU design, but with updated preamble fields, boosted transmit power for one or more preamble fields, and/or additional repetitions for one or more preamble fields. In some implementations, the wireless STA 104 may transmit an ELR wireless packet, such as an ELR PPDU, upon transmission and receipt of RTS and CTS signaling in accordance with an existing LR protocol or ELR packet protection protocol, where the ELR wireless packet may be referred to as a non-standalone ELR wireless packet, or a non-standalone ELR PPDU. In some other implementations, the wireless communications device may transmit an updated ELR wireless packet without RTS and CTS signaling or ELR packet protection protocol, which may be referred to as a standalone ELR wireless packet, or a standalone ELR PPDU. The standalone ELR wireless packet may include new or modified preamble fields and, such as an STF with a greater duration, a different base sequence than for existing LR protocol, or both, LTF repetitions, and a simplified SIG field. The STF may be an example of an L-STF 206, the LTF may be an example of an L-LTF 208, and the SIG fields may be examples of the L-SIG 210. To improve data rate and efficiency for the LR system, the wireless STA 104 may transmit the ELR wireless packet using a boosted transmit power of the STF, LTF, or both and/or may repeat the SIG fields, LTF, or both for the standalone or non-standalone ELR wireless packet.

Additionally, or alternatively, the wireless STA 104 may transmit an ELR wireless packet using a narrow bandwidth to increase coverage range for an LR system. In some implementations, the wireless STA 104 may use a downclocking ratio to downclock a transmit bandwidth from a relatively high bandwidth to a relatively low bandwidth, where the lower bandwidth has a lower noise floor thus higher SNR and correspondingly increases transmission range. Further, the wireless STA 104 may duplicate the ELR wireless packet in the frequency domain to improve communication reliability related to communication errors.

Figure 3:
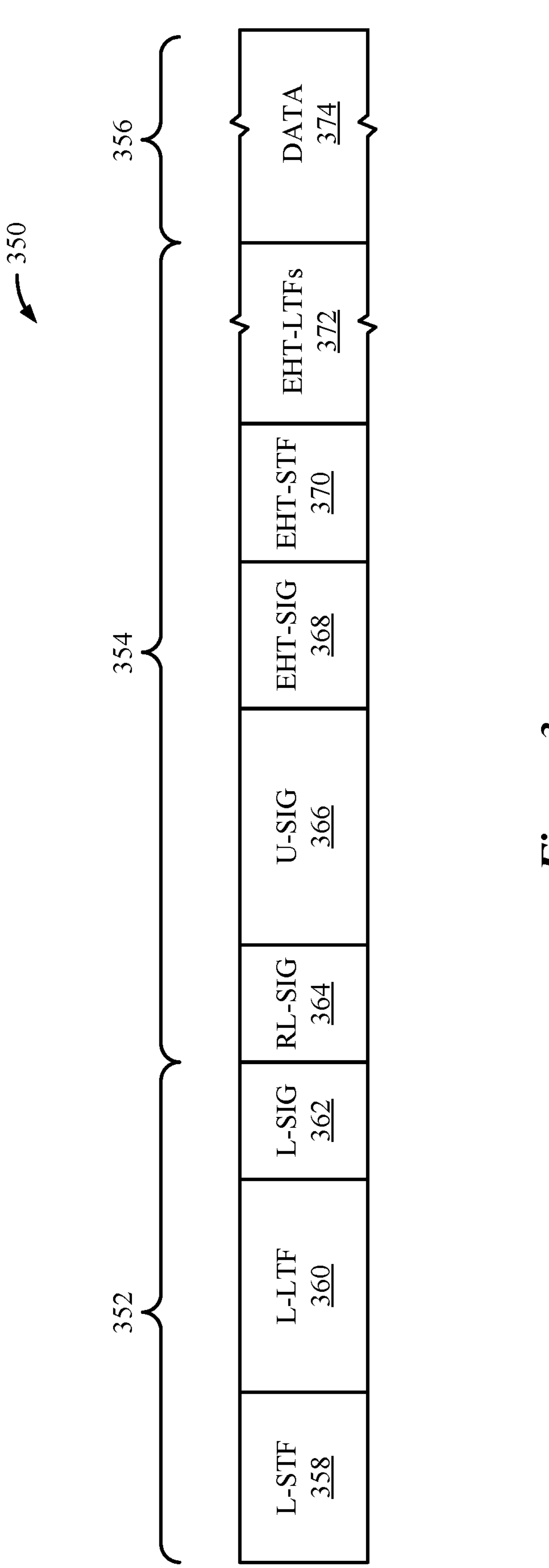
FIG. 3 shows an example physical layer (PHY) protocol data unit (PPDU) usable for communications between a wireless AP and one or more wireless STAs.

FIG. 3 shows another example PPDU 350 usable for wireless communication between a wireless AP 102 and one or more wireless STAs 104. The PPDU 350 may be used for SU, OFDMA or MU-MIMO transmissions. The PPDU 350 may be formatted as an Extremely High Throughput (EHT) WLAN PPDU in accordance with the IEEE 802.11be amendment to the IEEE 802.11 family of wireless communication protocol standards, or may be formatted as a PPDU conforming to any later (post-EHT) version of a new wireless communication protocol conforming to a future IEEE 802.11 wireless communication protocol standard, such as the 802.11 amendment associated with Wi-Fi 8), or another wireless communication standard. The PPDU 350 includes a PHY preamble including a legacy portion 352 and a non-legacy portion 354. The PPDU 350 may further include a PHY payload 356 after the preamble, for example, in the form of a PSDU including a data field 374.

The legacy portion 352 of the preamble includes an L-STF 358, an L-LTF 360, and an L-SIG 362. The non-legacy portion 354 of the preamble includes a repetition of L-SIG (RL-SIG) 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. One or both of U-SIG 366 and EHT-SIG 368 may be structured as, and carry version-dependent information for, other wireless communication protocol versions associated with amendments to the IEEE family of standards beyond EHT. For example, U-SIG 366 may be used by a receiving device to interpret bits in one or more of EHT-SIG 368 or the data field 374.

The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). EHT-STF 370 may be used for timing and frequency tracking and AGC, and EHT-LTF 372 may be used for more refined channel estimation.

EHT-SIG 368 may be used by an AP 102 to identify and inform one or multiple STAs 104 that the AP 102 has scheduled UL or DL resources for them. EHT-SIG 368 may be decoded by each compatible STA 104 served by the AP 102. EHT-SIG 368 may generally be used by a receiving device to interpret bits in the data field 374. For example, EHT-SIG 368 may include RU allocation information, spatial stream configuration information, and per-user (for example, STA-specific) signaling information. Each EHT-SIG 368 may include a common field and at least one user-specific field. In the context of OFDMA, the common field can indicate RU distributions to multiple STAs 104, indicate the RU assignments in the frequency domain, indicate which RUs are allocated for MU-MIMO transmissions and which RUs correspond to OFDMA transmissions, and the number of users in allocations, among other examples. The user-specific fields are assigned to particular STAs 104 and carry STA-specific scheduling information such as user-specific MCS values and user-specific RU allocation information. Such information enables the respective STAs 104 to identify and decode corresponding RUs in the associated data field 374.

In some wireless communications environments, EHT systems or other systems compliant with future generations of the IEEE 802.11 family of wireless communication protocol standards may provide additional capabilities over other previous systems (for example, High Efficiency (HE) systems or other legacy systems). EHT and newer wireless communication protocols may support flexible operating bandwidth enhancements at APs 102 and STAs 104, such as broadened operating bandwidths relative to legacy operating bandwidths or more granular operation relative to legacy operation. For example, an EHT system may allow communications spanning operating bandwidths of 20 MHz, 40 MHz, 80 MHz, 160 MHz, 240 MHz and 320 MHz. EHT systems may support multiple bandwidth modes such as a contiguous 240 MHz bandwidth mode, a contiguous 320 MHz bandwidth mode, a noncontiguous 160+160 MHz bandwidth mode, or a noncontiguous 80+80+80+80 (or "4×80") MHz bandwidth mode.

In some implementations in which a wireless communication device operates in a contiguous 320 MHz bandwidth mode or a 160+160 MHz bandwidth mode. Signals for transmission may be generated by two different transmit chains of the device each having a bandwidth of 160 MHz (and each coupled to a different power amplifier). In some other examples, signals for transmission may be generated by four or more different transmit chains of the device, each having a bandwidth of 80 MHz.

In some other examples, the wireless communication device may operate in a contiguous 240 MHz bandwidth mode, or a noncontiguous 160+80 MHz bandwidth mode. In some implementations, the signals for transmission may be generated by three different transmit chains of the device, each having a bandwidth of 80 MHz. In some other examples, the 240 MH2/160+80 MHz bandwidth modes also may be formed by puncturing 320/160+160 MHz bandwidth modes with one or more 80 MHz subchannels. For example, signals for transmission may be generated by two different transmit chains of the device each having a bandwidth of 160 MHz with one of the transmit chains outputting a signal having an 80 MHz subchannel punctured therein.

The operating bandwidth also may accommodate concurrent operation on other unlicensed frequency bands (such as the 6 GHz band) and a portion of spectrum that includes frequency bands traditionally used by Wi-Fi technology. In noncontiguous examples, the operating bandwidth may span one or more disparate sub-channel sets. For example, the 320 MHz bandwidth may be contiguous and located in the same 6 GHz band or noncontiguous and located in different bands (such as partly in the 5 GHz band and partly in the 6 GHz band).

In some implementations, operability enhancements associated with EHT and newer generations of the IEEE 802.11 family of wireless communication protocols, and in particular operation at an increased bandwidth, may include refinements to carrier sensing and signal reporting mechanisms. Such techniques may include modifications to existing rules, structure, or signaling implemented for legacy systems.

A wireless STA 104 may transmit an ELR wireless packet to an AP 102 with an existing PPDU design, but with updated preamble fields, boosted transmit power for one or more preamble fields, and/or additional repetitions for one or more preamble fields. In some implementations, the wireless STA 104 may transmit an ELR wireless packet, such as an ELR PPDU, upon transmission and receipt of RTS and CTS signaling, where the ELR wireless packet may be referred to as a non-standalone ELR wireless packet, or a non-standalone ELR PPDU. In some other implementations, the wireless communications device may transmit an updated ELR wireless packet without RTS and CTS signaling or ELR packet protection protocol, which may be referred to as a standalone ELR wireless packet, or a standalone ELR PPDU. The standalone ELR wireless packet may include new or modified preamble fields such as an STF with a greater duration, a different base sequence than for existing LR protocol, or both, LTF repetitions, and a simplified SIG field. The STF may be an example of an L-STF 358 and/or EHT-STF 370, the LTF may be an example of an L-LTF 360 and/or EHT-LTFs 372, and the SIG fields may be examples of the L-SIG 362, RL-SIG 364, U-SIG 366, and/or EHT-SIG 368. To improve data rate and efficiency for the LR system, the wireless STA 104 may transmit the ELR wireless packet using a boosted transmit power of the STF, LTF, or both and/or may repeat the SIG fields, LTF, or both for the standalone or non-standalone ELR wireless packet.

Additionally, or alternatively, the wireless STA 104 may transmit an ELR wireless packet using a narrow bandwidth to increase coverage range for an LR system. In some implementations, the wireless STA 104 may use a downclocking ratio to downclock a transmit bandwidth from a relatively high bandwidth to a relatively low bandwidth, where the lower bandwidth has a lower noise floor thus higher SNR and correspondingly increases transmission range. Further, the wireless STA 104 may duplicate the ELR wireless packet in the frequency domain to improve communication reliability related to communication errors.

FIG. 4 shows an example of a signaling diagram 400 that supports techniques for ELR wireless packet transmission in accordance with ELR wireless packet design. In some implementations, the signaling diagram 400 may implement aspects of the wireless communication network 100, the PDU 200, and the PPDU 300. The signaling diagram 400 illustrates communications between one or more APs, such as an AP 102-*a*, and/or one or more STAs, such as a STA 104-*a*. The AP 102-*a* may be an example of an AP 102 described with reference to FIG. 1. The STA 104-*a* may be an example of a STA 104 described with reference to FIG. 1.

In some implementations, an AP 102-*a* may transmit wireless packets to a STA 104-*a* via a communication link 106-*a*. Similarly, the AP 102-*a* may receive wireless packets from the STA 104-*a* via a communication link 106-*b*. The processes described as being performed by the STA 104-*a* may additionally, or alternatively, be performed at the AP 102-*a*. For example, the signaling described as being sent from the STA 104-*a* to the AP 102-*a* may additionally, or alternatively, be sent from the AP 102-*a* to the STA 104-*a*. Similarly, the signaling described as being sent from the AP 102-*a* to the STA 104-*a* may additionally, or alternatively, be sent from the STA 104-*a* to the AP 102-*a*.

In some WLANs, one or more wireless devices, such as wireless STAs 104 and/or wireless APs 102, may extend a distance, or coverage range, over which wireless coverage is provided. The coverage range may be a distance to which an AP 102, such as the AP 102-*a*, provides service to one or more STAs 104, such as the STA 104-*a*. In some implementations, if the STA 104-*a* exceeds a threshold distance from the AP 102-*a*, the STA 104-*a* may be outside of the coverage range. The threshold distance may depend on how far signaling between the STA 104-*a* and the AP 102-*a* reliably travels. The wireless devices may operate using a relatively low frequency band, such as a 2.4 GHz frequency band, rather than a higher frequency band, such as a 5 GHz or 6 GHz frequency band, because the lower frequency band may use a longer wave, which may improve the coverage range and provide improved transmission through objects. Such wireless communications systems may be referred to as LR wireless communications systems. However, one or more wireless devices may still be outside of the coverage range of an LR wireless communications system. Further, the data rate of the communications in the LR wireless communications system may be relatively low due to slower transmission time using longer waves, which may cause latency and relatively low throughput when compared with a OFDM-based system that uses the same or a higher frequency band.

In some implementations, to improve signaling throughput and efficiency while maintaining a coverage range for the LR wireless communications system, an AP 102-*a*, a STA 104-*a*, or both may update a wireless packet design for the LR system, where the resulting wireless packet may be referred to as an ELR wireless packet 405. The ELR wireless packet 405 may have a preamble 410 with one or more fields and a data field 415. An ELR wireless packet 405 may provide for increased signaling throughput and efficiency, extended range, or the like when compared with existing LR wireless packet protocols. For example, the ELR wireless packet 405 may have a target data rate, such as a modulation and coding scheme (MCS) target data rate, where the MCS specifies a data rate, a channel bandwidth, and/or a number of antennas or spatial streams at a transmitting wireless communications device. The MCS may be MCS14 defined for 20 MHz, or MCS0 with 4 repetitions of the ELR wireless packet 405, with a data rate of about 2 megabits per second (Mbps), or MCS0 with 3 repetitions of the ELR wireless packet 405, with a data rate of about 2.7 megabits per second (Mbps). MCS0 and MCS14 may be MCSs with index 0 and index 14, respectively. Each MCS may provide for a different data rate, such that MCS0 may have a lower data rate than MCS14.

In some implementations, such as for OFDM communications, the physical layer (PHY) signaling efficiency may be based on a signal-to-noise ratio (SNR) for communications, a data rate, a channel model, a receive antenna configuration, and combining loss during decoding. The AP 102-*a*, the STA 104-*a*, or both may target a signal-to-noise ratio, which may be a difference between a received signal and a noise floor. The AP 102-*a* and the STA 104-*a* may specify a channel for the communications. The channel may be an additive white Gaussian noise (AWGN) channel, in which the interference in the communication is modeled as a linear addition of wideband or white noise with a constant spectral density and a Gaussian distribution of amplitude. The channel may be a directed non-line-of-sight (DNLOS) channel, in which the signal is propagated outside of the line-of-sight (LOS) between the transmitting device and the receiving device. The data rate may be 8 Mbps, 4 Mbps, 2 Mbps, 1 Mbps, or any other data rate. A receiving wireless device may have one receive antenna, which may be a receive antenna configuration of 1×1, or may have multiple receive antennas in a configuration of 1×2. If the receiving wireless device has multiple receive antennas, the gain from any repetitions, or duplications (DUPs), of a transmission may be reduced. The signaling efficiency may be based on a data demodulation SNR at a percentage of packet error rate (PER), such as 10% PER. In some implementations, the transmitting wireless device may apply power boosting to fields in the preamble of a wireless packet, such as 3 decibel (3 dB) LTF boosting, to reduce combining loss, which results from combining multiple versions, or repetitions, of a signal during the decoding process.

For an AWGN channel model, the signaling efficiency may be based on hardware capability of the receiving wireless device, repetition combining, and LTF boosting. In some implementations, a lower demodulation SNR requirement may transfer to an increase in coverage range depending on the transmit power. For a DNLOS channel model, the communication efficiency may increase from frequency diversity in combining repetitions. However, lower SNR values may not fully transfer to coverage increase due to different power amplifier (PA) backoff values. For existing LR wireless communications, the transmission may have a 3 dB lower PA backoff than ELR due to a single carrier waveform and a narrow bandwidth for the transmission. With a sharper transmission filter for OFDM based ELR, the transmit power difference between existing LR and OFDM based ELR may be reduced, such as to 2 dB or 1.5 dB. For a subband ELR transmission, the transmit power difference may be further reduced, such as to 0.7 dB.

In some implementations, to improve communication throughput and efficiency while maintaining a coverage range for the LR wireless communications system, an AP 102-*a*, a STA 104-*a*, or both may use an existing OFDM-based wireless communications system preamble, such as a 20 MHz preamble, with one or more changes. In some implementations, the STA 104-*a* may use one or more power levels for fields of the preamble 410 that are dedicated to ELR wireless communications. The STA 104-*a* may perform power boosting on the fields of the preamble 410 to reach the power levels. Specifically, the STA 104-*a* may boost the transmit power of an ELR STF 420, such as by 3 dB when compared with the transmit power for data portion of the ELR packet. The power boosting may provide for a receiving device to improve packet detection, as the power boosting may improve an SNR for the signaling. Similarly, the STA 104-*a* may boost the transmit power of an ELR LTF 425, such as by 3 dB when compared with the transmit power for the data portion of ELR wireless packet 405. The STA 104-*a* may boost the transmit power of the ELR LTF 425 to meet the channel estimation requirement for a repetition of one or more SIG fields 430 and/or a repetition of the data field 415.

In addition, or as an alternative to power boosting, the STA 104-*a* may perform one or more additional repetitions of fields of the preamble 410. For example, the STA 104-*a* may repeat the ELR STF 420 or ELR LTF 425 (not shown), For another example, the STA 104-*a* may repeat the SIG fields 430, such that the preamble 410 includes a SIG field repetition 435. The SIG fields may include an L-SIG field, an RL-SIG field, or both. Further, the STA 104-*a* may transmit a simplified SIG field 430 to reduce signaling overhead. The simplified SIG field may include an indication of whether the ELR wireless packet 405 is for a single user or not, a coding scheme for the ELR wireless packet 405, a length of the ELR wireless packet 405, an MCS, a bandwidth of the ELR wireless packet 405, a resource unit size of the ELR wireless packet 405, or any combination thereof.

A wireless packet, such as a LR PPDU, may include a spoofing preamble, a preamble, and data. In some implementations, the ELR wireless packet 405 may be a non-standalone ELR PPDU that reuses an existing PPDU format with lower data rate than legacy formats, such as for an existing OFDM-based communication PPDUs or a new greenfield OFDM-based PPDU, or a standalone ELR PPDU with a new or updated preamble and data design that operates at a relatively low SNR. The standalone ELR PPDU may include a new or updated design of an STF, an LTF, or both to obtain the ELR STF 420, the ELR LTF 425, or both, or power boosted STF and LTF in the existing OFDM-based PPDU that accommodate detection at a relatively low SNR.

In some implementations, for a non-standalone ELR PPDU, the STA 104-*a* may transmit the ELR wireless packet 405 with a preceding exchange of RTS 440 and CTS 445 between STA and AP, such that an intended receiver decodes the ELR wireless packet 405 with protection. The RTS 440 and the CTS 445 may be the same as an existing LR wireless communications protocol, and may be similar to a trigger frame that triggers transmission of the ELR wireless packet 405, which is described in further detail with respect to FIG. 5 and FIG. 6. The RTS 440 and the CTS 445 signaling may be sent before each ELR wireless packet 405 and/or LR wireless packet, and may provide protection and synchronization for a data transmission. Upon successfully transmitting and receiving the RTS 440 and the CTS 445, an initial timing and frequency synchronization between the STA 104-*a* and the AP 102-*a* may be established.

If the STA 104-*a* transmits the ELR wireless packet 405 a short interframe space (SIFS) time after receiving the CTS 445, the AP 102-*a* may not perform packet detection. A SIFS time includes a delay at the receiver radio frequency module, physical layer convergence protocol (PLCP) delay, and medium access control (MAC) processing delay, which may depend on the PHY layer used. The STA 104-*a* may use an existing OFDM-based PPDU format or simple OFDM-based greenfield format that supports a lower data rate. For example, the STA 104-*a* may use a same STF as in an existing OFDM-based PPDU for the AP 102-*a* to perform AGC setting, timing and frequency fine tuning, as well as other operations. Similarly, the STA 104-*a* may use a same LTF sequence with LTF repetitions as in an OFDM PPDU, which may provide a more accurate channel to accommodate data repetition combining. The STA 104-*a* may use a simple SIG field 430, similar to an L-SIG field, to indicate whether the ELR wireless packet 405 is for a single user or not, a coding scheme for the ELR wireless packet 405, a length of the ELR wireless packet 405, an MCS, a bandwidth of the ELR wireless packet 405, a resource unit size of the ELR wireless packet 405, or any combination thereof.

In some implementations, the STA 104-*a* may use 4 symbols for 4 repetitions of an L-SIG field. Further, the STA 104-*a* may repeat an EHT-LTF twice for an MCS14 that is defined for 20 MHz having MCS 0 with 4 repetitions or MCS0 with 3 repetitions of the ELR wireless packet 405 or a subband with MCS15 with data combining. For a new greenfield UHR PPDU, the STF may be an UHR-STF and the LTF may be an UHR LTF that are similar to L-STF and L-LTF, respectively. The STA 104-*a* may transmit the SIG fields 430 and data field 415 with ELR modulation.

In some implementations, for a standalone ELR PPDU, the STA 104-*a* may transmit the ELR wireless packet 405 with a self-contained independent ELR PPDU. For example, the standalone ELR PPDU may have a new low data rate preamble and a low data rate data field that operate at a relatively low SNR. The ELR PPDU may have a new or extended STF, such as the ELR STF 420, that accommodates detection at the relatively low SNR. The ELR STF 420 may be compatible with legacy OFDM-based WLAN systems protocol. For example, the ELR STF 420 may have a base sequence periodicity of 800 nanoseconds (ns), and may have a repetition with an orthogonal cover to extend the duration to a length, such that the ELR PPDU may not have a spoofing preamble. For the ELR STF 420, the STA 104-*a* also may send an ELR LTF 425 with a new sequence to accommodate time domain processing, such as a symbol boundary estimation. The STA 104-*a* may repeat the ELR LTF 425 in accordance with an OFDM PPDU format, which may provide a more accurate channel to accommodate data repetition combining. The STA 104-*a* may use a simple SIG field 430, similar to an L-SIG field, with 3 or 4 ELR wireless packet 405 repetitions, to indicate whether the ELR wireless packet 405 is for a single user or not, a coding scheme for the ELR wireless packet 405, a length of the ELR wireless packet 405, an MCS, a bandwidth of the ELR wireless packet 405, a resource unit size of the ELR wireless packet 405, or any combination thereof.

The STA 104-*a* may construct the ELR STF 420 that accommodates an ELR data rate using a new length, or duration, that is greater than a length of an STF for LR communications. For example, the ELR STF 420 may have length of about 20 microseconds (μs) in accordance with detection and an AGC setting. The base sequence candidates for the ELR STF 420 may include a Barker sequence with pseudo-noise (PN) code, a repeated Golay sequence, such as Golay 128, a Zadoff-Chu sequence, or any other STF sequence. Additionally, or alternatively, the STA 104-*a* may perform power boosting when transmitting the ELR STF 420 to support the ELR data rate, which may be an example of an existing STF, such as for other WLAN communications. The ELR data rate may be an MCS14 defined for 20 MHz data rate or MCS0 with 4 times repetitions in ELR wireless packet 405 or 3 times repetitions in ELR wireless packet 405 repetitions. The STA 104-*a* may boost the power but result in some power loss due to clipping, which may be a form of signal distortion once a power exceeds a power threshold. For example, the effective power gain with 3 dB power boosting is 1.9 dB for L-STF and 1.8 dB for L-LTF. The new sequence with a lower peak-to-average-power ratio (PAPR) may result in a smaller power loss. A lower ELR STF 420 and/or ELR LTF 425 PAPR when compared with a PAPR of the existing STF for existing WLAN communications may result in a smaller power loss.

In some implementations, the ELR wireless packet 405 may have a higher data rate than LR wireless communications systems, but a lower data rate than other WLAN systems. The target data rate for the ELR wireless packet 405 may be a data rate similar to an MCS14 data rate defined for 20 MHz, which may be half of MCS0 and digital code modulation (DCM), such as around 2 Mbps, or similar to MCS0 with 3 times repetitions in ELR wireless packet 405, such as around 2.7 Mbps. In some implementations, to achieve the target data rate, the STA 104-*a* may select a form of repetitions, which may depend on PAPR and demodulator performance. The form of repetitions may include new interleaving parameters, such as for 10 MHz with DCM. The form of repetitions may include performing DCM and multiple time domain repetitions, such as two time domain repetitions. In some implementations, each time domain repetition may have different interleaving parameters to maximize frequency diversity The form of repetitions may include encoding the ELR wireless packet 405 with a lower effective code rate, such as a quarter or an eighth of the code rate. The form of repetitions may include using a BPSK scheme with additional spreading masked by some low PAPR code. The form of repetitions may include combination of frequency repetition plus time domain repetition. The target data rate may be achieved by using a portion of a bandwidth for the transmission and an updated MCS scheme, such as MCS15.

In some implementations, the STA 104-*a* may select a tone plan for the transmission, where a tone is a subcarrier used for a transmission and the tone plan maps the subcarriers to the signaling. The tone plan may include a tone plan with a relatively short cyclic prefix (CP) that may not support OFDMA signaling, where the target data rate may be achieved using an MCS with repetitions over the full bandwidth, such as MCS14 with four repetitions over 20 MHz. The tone plan may include a tone plan with a relative long CP and improved tone efficiency, which may support downlink or uplink OFDMA and a partial bandwidth transmission, where the target data rate may be achieved by using an MCS and optionally with a partial bandwidth transmission, such as using MCS14 or a partial bandwidth transmission with MCS15. Using a portion of the bandwidth for a transmission may reduce PAPR and spectrum roll-off.

In some implementations, the STA 104-*a* may perform a full bandwidth OFDM transmission, such as using a 20 MHz frequency band, which may have a relatively high PAPR for the data field 415 due to using OFDM. The PA backoff for the ELR wireless packet 405 may be relatively low, such that the higher PAPR may result in a relatively large power loss. In some other implementations, the STA 104-*a* may perform a full bandwidth SC-FDM transmission for the data field 415, such as using a 20 MHz frequency band. In some other implementations, the STA 104-*a* may perform a partial bandwidth OFDMA transmission, such as using 10 MHz of a 20 MHz frequency band. For the partial bandwidth transmission, a PAPR for the data field 415 may be reduced with fewer tones. The partial bandwidth transmission maybe subject to diversity loss, which may be reduced by using multiple receive antenna diversity. In some implementations, using a partial bandwidth for a transmission, resource units may be on the edge of the frequency band. Thus, if a resource unit is at the edge, the STA 104-*a* may perform clipping and sharper filtering to reduce power backoff needed to meet spectral mask. Additionally, or alternatively, the STA 104-*a* may define a new resource unit that is closer to the center of the frequency band.

FIG. 5 shows an example of a signaling diagram 500 that supports ELR wireless packet transmission in accordance with a narrow bandwidth ELR wireless packet design. In some implementations, the signaling diagram 500 may implement aspects of the wireless communication network 100, the PDU 200, and the PPDU 300. The signaling diagram 500 illustrates communications between one or more APs, such as an AP 102-*b*, and/or one or more STAs, such as a STA 104-*b*. The AP 102-*b* may be an example of an AP 102 described with reference to FIG. 1. The STA 104-*b* may be an example of a STA 104 described with reference to FIG. 1.

In some implementations, an AP 102-*b* may transmit wireless packets to a STA 104-*b* via a communication link 106-*c*. Similarly, the AP 102-*b* may receive wireless packets from the STA 104-*b* via a communication link 106-*d*. The processes described as being performed by the STA 104-*b* may additionally, or alternatively, be performed at the AP 102-*b*. For example, the signaling described as being sent from the STA 104-*b* to the AP 102-*b* may additionally, or alternatively, be sent from the AP 102-*b* to the STA 104-*b*. Similarly, the signaling described as being sent from the AP 102-*b* to the STA 104-*b* may additionally, or alternatively, be sent from the STA 104-*b* to the AP 102-*b*.

In some WLANs, one or more wireless devices, such as wireless STAs 104 and/or wireless APs 102, may extend a distance, or coverage range, over which wireless coverage is provided. The coverage range may be a distance to which an AP 102, such as the AP 102-*b*, provides service to one or more STAs 104, such as the STA 104-*b*. In some implementations, if the STA 104-*b* exceeds a threshold distance from the AP 102-*b*, the STA 104-*b* may be outside of the coverage range. The threshold distance may depend on how far signaling between the STA 104-*b* and the AP 102-*b* reliably travels. The wireless devices may operate using a relatively low frequency band, such as a 2.4 GHz frequency band, rather than a higher frequency band, such as a 5 GHz or 6 GHz frequency band, because the lower frequency band may use a longer wave, which may improve the coverage range and provide improved transmission through objects. Such wireless communications systems may be referred to as LR wireless communications systems. However, one or more wireless devices may still be outside of the coverage range of an LR wireless communications system. Further, the data rate of the communications in the LR wireless communications system may be relatively low due to slower transmission time using longer waves, which may cause latency and relatively low throughput when compared with a OFDM-based system that uses the same or a higher frequency band.

In some implementations, to extend a coverage range for the LR wireless communications system, an AP 102-*b*, a STA 104-*b*, or both may update a wireless packet design for the LR system, where the resulting wireless packet may be referred to as an ELR wireless packet 505. The ELR wireless packet 505 may have a preamble 510 with one or more fields and a data field 515. An ELR wireless packet 505 may provide for increased extended range when compared with existing LR wireless packet protocols while maintaining a similar, or even lower, data rate. For example, the STA 104-*b* may improve the range at 1 Mbps by about 13 dB compared to existing LR wireless packet protocols with a target range of 1 kilometer (km). The data rate may be 150 kilobits (kbps) or lower.

In some implementations, the STA 104-*b*, the AP 102-*b*, or both may improve, or extend, the coverage range for the LR wireless communications system by redesigning a detection algorithm to accommodate an SNR for the ELR wireless packet 505 or by using a narrow bandwidth for the ELR wireless packet 505. The STA 104-*b* and the AP 102-*b* may use an MCS for the ELR wireless packet 505, such as MCS0 and MCS15, or MCS14 defined for 20 MHz. In some implementations, the STA 104-*b* may transmit the ELR wireless packet 505 to the AP 102-*b* using the narrow bandwidth preamble 510 and the narrow bandwidth data field 515 with frequency hopping to satisfy a power spectral density (PSD) threshold.

The STA 104-*b* may perform downclocking of a transmit bandwidth for the ELR wireless packet 505 in accordance with a downclocking ratio, where downclocking reduces a transmit frequency by a fraction defined by the downclocking ratio. For example, the STA 104-*b* may downclock a 20 MHz signal by 5 to a 4 MHz signal. In some implementations, the STA 104-*b* may utilize a downclocked wireless packet 505 with varying structures (for example, PPDUs conforming to the IEEE 802.11ac, or 802.11be standard amendments, among other examples). The wireless packet 505 may include a relatively short preamble 510 and a relatively short data symbol duration. For example, the SIG fields 535 of the wireless packet 505 may include an L-SIG filed, a VHT-SIG1 filed, and a VHT-SIG2 field. The preamble 510 may additionally, or alternatively, include a VHT-STF field, a VHT-LTF field, and a VHT-SIGB field, for example (not pictured in FIG. 5). Additionally, or alternatively, the wireless packet 505 may include an improved data rate and bandwidth efficiency and a relatively long preamble 510 and data symbol duration. For example, the SIG fields 535 may include an L-SIG field, an RL-SIG field, a U-SIG filed, and an EHT-SIG field, or any combination thereof. The preamble 510 may additionally, or alternatively, include an EHT-STF and an EHT-LTF field (not pictured in FIG. 5).

In some implementations, a wireless packet 505 may be paired with other users associated with a same or similar downclocking ratio. In such cases, if a power imbalance is present between uplink and downlink, the STA 104-*b* may utilize subchannels and an RU allocation table for the downclocked bandwidth. Additionally, or alternatively, the STA 104-*b* may utilize a trigger frame for a narrowband transmission, which may be signaling from the AP 102-*b* that triggers transmission of the ELR wireless packet 505.

In some implementations, the STA 104-*b* may duplicate the ELR wireless packet 505 in the frequency domain to occupy the frequency band, such as the 20 MHz frequency band. The STA 104-*b* may transmit one or more frequency domain repetitions 520, or duplications, of the ELR wireless packet 505 to improve reliability. For example, the STA 104-*b* may improve reliability of a ELR STF 525, and/or a SIG field 535 in the preamble 510 by transmitting an ELR STF repetition 540, an ELR LTF repetition 545, and/or a SIG field repetition 550. Additionally, or alternatively, the STA 104-*b* may improve reliability of the data field 515 by transmitting a data field repetition 555. The AP 102-*b* may receive the frequency domain repetitions 520 and combine them to decode the ELR wireless packet 505.

In some implementations, the STA 104-*b* may perform power boosting and/or TD repetition to improve reliability of one or more fields of the preamble 510. In some implementations, to get a 6 dB range extension, the STA 104-*b* may use a downclocking ratio of 8 with enlarged tone spacing on STF, such that the bandwidth for the transmission is 2.5 MHz, using MCS15, the STA 104-*b* may instead use a downclocking ratio of 5 using MCS14, or MCS15 with two frequency domain repetitions 520 of the ELR wireless packet 505, to accommodate a range gain threshold and carrier frequency offset (CFO) correction threshold. To achieve a 1 km coverage range, the STA 104-*b* may use a downclocking ratio of 10 using MCS14 and power boosting on STF with enlarged tone spacing and LTF, or use a downclocking ratio of 20 using MCS15 with 3 dB power boosting on the ELR STF 525 with enlarged tone spacing and the ELR LTF 530.

In some implementations, such as if the data rate is relatively low for the ELR wireless packet 505, the preamble 510 may cause delays. Thus, to achieve a 6 dB range extension, the STA 104-*b* may use a downclocking ratio of 8 using MCS15 to transmit with a 510 kbps data rate. A downclocking ratio of 5 with MCS15 may not be sufficient to achieve the range gain, but may reduce the CFO error, thus using additional frequency domain repetitions 520 may compensate for the range gain. To achieve a 1 km range, the data rate may be 150 kbps or lower. The STA 104-*b* may use a downclocking ratio of 10 with four frequency domain repetitions, where both the ELR STF 525 and the ELR LTF 530 may have 3 dB power boosting for packet detection and repetition combining.

In some implementations, to obtain the narrow bandwidth for the ELR wireless packet 505, the STA 104-*b* may perform downclocking while using a same tone plan as a full bandwidth transmission. For example, the STA 104-*b* may downclock a transmit frequency from 20 MHz to a desired narrow bandwidth, such as 2.5 MHz. By downclocking, the STA 104-*b* may gain an SNR boost on both the preamble 510 and the data field 515 from a relatively smaller noise power. The downclocked ELR wireless packet 505 may have a same packet processing as the full bandwidth, except for a sampling clock. In some implementations, such as for OFDMA transmissions, the STAs 104 contributing to an uplink transport block also may be ELR and downclocking capable. Downclocking results in a smaller tone spacing and consequently longer symbol duration, which may cause the STA 104-*b* to support a smaller CFO error. For example, with a downclocking ratio of 8, the STA 104-*b* may support a maximum CFO of 78 kHz.

In some implementations, to increase a pulling range for CFO estimation, the STA 104-*b* may increase frequency spacing between populated STF tones, or may reduce the length of a STF sequence in each copy of the time domain repetitions. The STA 104-*b* may increase the frequency spacing such that half of the populated STF tone spacing is greater than a threshold frequency, such as 96 kHz. That is, the STA 104-*b* may populate the STF tones every $8^{th}$ tone rather than every $4^{th}$ tone, such that the CFO the STA 104-*b* may be able to correct is greater than 96 kHz, which may involve redesigning the STF for ELR wireless communications. Additionally, or alternatively, to increase the pulling range for CFO estimation, the STA 104-*b* may select a lower downclocking ratio, such that tone spacing is above a threshold to correct a maximum CFO. For example, the STA 104-*b* may select a downclocking ratio of 5 to accommodate ELR and an OFDMA communication structure. However, with lower downclocking ratio, the coverage range gain also may be lower than the target, thus the STA 104-*b* may transmit additional frequency domain repetitions 520.

In some implementations, the STA 104-*b* may transmit the data field 515 with relatively small resource unit sizes using an existing tone plan, along with the narrow bandwidth preamble 510 (for example, RU-based ELR). The bandwidth of the preamble 510 may be the same as the resource unit bandwidth for the data field 515. In some implementations, the ELR wireless packet 505 may be grouped in a same OFDMA transmission with non-ELR transmissions. The ELR wireless packet 505 may be multiplexed in the same OFDMA transmission as the non-ELR transmissions using a same tone plan, tone spacing, and symbol duration. In some implementations, the ELR wireless packet 505 may be transmitted with a 20 MHz preamble portion and a narrowband resource unit portion, which may include an EHT STF, an EHT LTF, the data filed 555, or any combination thereof. In some other implementations, the ELR wireless packet 505 may be transmitted without the 20 MHz preamble portion, and the other non-ELR transmissions may be transmitted with the 20 MHz preamble portion. In some other implementations, each ELR wireless packet 505 may be transmitted with an extended long EHT STF for assigned resource unit to cover a transport block PPDU duration followed by a remaining narrowband resource unit portion.

The STA 104-*b* may use a same tone plan, including same tone spacing and symbol duration, for the SIG fields 535 as the data field 515. The SIG fields 535 may be simple and may indicate whether the ELR wireless packet 505 is for a single user or multiple users, a coding scheme for the ELR wireless packet 505, a length of the ELR wireless packet 505, an MCS, a bandwidth of the ELR wireless packet 505, a resource unit size of the ELR wireless packet 505, or any combination thereof. If the STA 104-*b* transmits the data field 515 using a larger resource unit size than the basic size of the SIG field 535 to hold all the signaling bits, the STA 104-*b* may duplicate the SIG field 535 in each basic resource unit within resource unit for data. A tone plan for the ELR LTF 530 may match the tone plan of the resource unit size of the data field 515, and populating every tone, every other tone, or every $4^{th}$ tone as legacy protocol.

In some implementations, a tone plan may not have sufficient CP length to achieve a target SNR value. Thus, the STA 104-*b* may populate the ELR STF 525 on every $4^{th}$ tone or $8^{th}$ tone within the assigned resource unit to provide for estimating a maximum CFO error, such as up to 96 kHz or 156 kHz. The ELR STF 525 may have a threshold length, or duration, such as 40 μs or 48 μs long, for packet detection, AGC setting, timing estimation, frequency estimation, or any combination thereof. The STA 104-*b* may populate the ELR STF 525 on every $16^{th}$ tone within the assigned resource unit, which may provide less accurate AGC gain setting. The wireless devices, including the STA 104-*b*, performing OFDMA transmission may need orthogonality ensured by same symbol duration and CP length when using a designated frequency band and populating tones within assigned resource units. For example, to ensure orthogonality in OFDMA, each narrow band user may perform a 256 point Fast Fourier Transform (FFT) for the 20 MHz frequency band, and may populate tones within an assigned resource unit or narrow band. In some implementations, for UHR communications, the STA 104-*b* may adjust the length of the ELR STF 525 to accommodate AGC and synchronization for an UHR-STF.

For example, if the STA 104-*b* transmits an UHR-STF using a bandwidth of 4 MHz, which is 5 times narrower than a 20 MHz frequency band, the signal may experience 7 dB SNR boosting, which may result in a 7 dB longer range. As such the AP 102-*b* may perform packet detection at same SNR as a L-STF, for which the AP 102-*b* may have a same number of samples in 4 MHz frequency band as L-STF in the 20 MHz frequency band. In some implementations, the STA 104-*b* may use 160 20 MHz samples in the L-STF for packet detection. Thus, the STA 104-*b* may use 160 4 MHz samples for an UHR-STF to perform packet detection. This 4 MHz corresponds to 52 tones, and 160 4 MHz samples may have a duration of 40 μs. When the STA 104-*b* transmits a 4 MHz signal, the STA 104-*b* may increase a sample rate to 20 MHz using 256 tones. As such, 160 4 MHz samples may then be 800 20 MHz samples, which may be 3 OFDM symbols that is total 48 μs long including CP and populate every 4th tone. Currently in uplink OFDMA, a transmitting device may use an 8 μs STF populated every 8th tone, so each period may be 1.6 μs and there may be 5 periods for synchronization and AGC. So, the AP 102-*b* may use 40 μs for UHR-STF detection if detection and AGC are performed separately. Otherwise, the STA 104-*b* may use 48 μs for the UHR-STF in a narrow band preamble. The STA 104-*b* may adjust the STF length to cover AGC and synchronization, such as to 8 μs or 32 μs. Some of the AGC and synchronization time may scale with bandwidth, such as the number of samples to accurately measure the power. Thus, a narrowband transmission may have a longer time with a same number of samples. Some of the AGC and synchronization time, such as radio frequency switching and AGC adjust time, may not scale with bandwidth.

In some implementations, the STA 104-*b* may realize a lower data rate by performing frequency domain repetitions 520 of the ELR wireless packet 505, time domain repetitions of the ELR wireless packet 505, or combination of the two. Frequency domain repetitions 520 may provide combining gain with frequency diversity, but may cause PAPR issues and need adjustment to a tone plan or patch. Time domain repetitions may accommodate different tone plans, but may need the STA 104-*b* to apply an interleaver diversity to maximize a combining gain and also may need buffering for demodulation. In some other implementations, the STA 104-*b* may realize a lower data rate by performing a partial bandwidth transmission and combining with MCS0 or MCS15. The STA 104-*b* may use an edge resource unit or a center resource unit. Additionally, or alternatively, the STA 104-*b* may perform downclocking to boost a per tone power to improve coverage range for both the data field 515 and a preamble 510. For example, the STA 104-*b* may downclock a 20 MHz frequency band to 2.5 MHz to boost per tone power. A symbol duration with downclocking may be longer in accordance with the downclocking ratio. Downclocking may increase PSD. To avoid exceeding a PSD threshold, the STA 104-*b* may perform frequency hopping with downclocking.

In some implementations, the STA 104-*b* may wait to transmit the ELR wireless packet 505 until receiving a trigger frame 560, which may be signaling from the AP 102-*b* that triggers transmission of the ELR wireless packet 505. Thus, the STA 104-*b* may pre-synchronize with the AP 102-*b* in frequency and time. This may reduce preamble complexity and signaling overhead for the ELR wireless packet 505. Further, the AP 102-*b* may use a trigger frame 560 rather than the existing RTS and CTS signaling to increase a range of the transmission, such as by using a narrower bandwidth for the trigger frame 560. The trigger frame 560 may be utilized for scheduling uplink OFDMA transmissions with the ELR wireless packet 505 and one or more non-ELR packets, in some implementations.

The STA 104-*b* may construct the ELR STF 525 that accommodates the extended coverage range using a new length, or duration, that is greater than a length of an STF for legacy WLAN communications. For example, the ELR STF 525 may have length of about 20~120 microseconds (μs) in accordance with detection and an AGC setting, which may be longer than a comparative length for STFs provided by the 802.11a standard. The base sequence candidates for the ELR STF 525 may include a Barker sequence with pseudo-noise (PN) code, a repeated Golay sequence, such as Golay 128, a Zadoff-Chu sequence, or any other STF sequence. Additionally, or alternatively, the STA 104-*b* may perform power boosting when transmitting the ELR STF 525 to support the extended coverage range, which may be an example of an existing STF, such as for other WLAN communications. The ELR data rate may be an MCS14 or MCS0 with 3 repetitions of the ELR wireless packet 505. The STA 104-*b* may boost the power to get discounted power gain due to clipping. For example, the effective power gain with 3 dB power boosting is 1.9 dB for L-STF and 1.8 dB for L-LTF. The new sequence with a lower PAPR may result in a smaller power loss. A lower ELR STF 420 and/or ELR LTF 425 PAPR when compared with a PAPR of the data field 515 may result in a smaller power loss.

In some implementations, to achieve a 1 km range, the wireless packet 505 may utilize SNR boosting, such as 40 times SNR boosting to achieve a 150 kbps data rate. In some implementations, the wireless packet 505 may leverage a packet design for other frequency band communications and apply the packet design to 2.4 GHz frequency bands or higher. For example, to ensure orthogonality for some long range communications conveyed via a 1 MHz carrier frequency, each user may perform a 32 point Fast Fourier Transform (FFT) for the frequency band. The symbol duration without a guard interval may be around 32 microseconds, and there may be 24 data tones in the channel. A preamble design with STF and LTF sequences may fit in the 32 point FFT tone plane. For example, there may be four STF symbols, four LTF symbols, and six SIG symbols, each carrying six information bits. In some other implementations, to ensure orthogonality for some long range communications conveyed via a 2 MHz carrier frequency, each user may perform a 64 point Fast Fourier Transform (FFT) for the frequency band. A relatively short preamble design with STF and LTF sequences may fit in the 64 point FFT tone plane. For example, there may one SIG field with two SIG symbols and one or more additional LTFs for MIMO communications to reduce overhead for relatively small packets. Additionally, or alternatively, there may be one or more additional fields to convey other features, such as beamforming information or MU-MIMO information, for example.

Techniques described herein provide for the wireless packet 505 to be transmitted via a carrier frequency of 2.4 GHz or higher in accordance with repetitions of the 1 MHz packet design, the 2 MHz packet design, or both. By increasing a carrier frequency, a CFO error range may also increase. In some implementations, to account for the increased CFO error range, timing and frequency for a scheduled wireless packet 505 may be pre-corrected from an earlier message exchange. Additionally, or alternatively, the wireless packet 505 may include a new STF with a larger STF tone spacing. For example, the STF may populate every 8th tone, which may increase a CFO polling range and decrease a quantity of STF tones.

For example, the wireless packet 505 may include four STF symbols, four LTF symbols, and six SIG symbols, which may reuse an existing packet design to reduce complexity. In some other implementations, the wireless packet 505 may be transmitted via a carrier frequency of 2.4 GHz or higher in accordance with repetitions of the 2 MHz packet design. For example, the wireless packet 505 may be transmitted with two STF symbols, two LTF symbols, and two SIG symbols, which may improve frequency diversity, range gain, data rate, and bandwidth efficiency, among other examples. Thus, to achieve at least 10 dB range extension for 1 km range, the wireless packet 505 may be configured with an STF 525 that is populated every 8th tone and uses 1 MHz STF sequence, length, and boosting parameters. Such a wireless packet 505 may additionally, or alternatively, include an LTF 530 that is boosted to support MCS14, a SIG. field 535 with six symbols, and MCS14 data.

Figure 6:
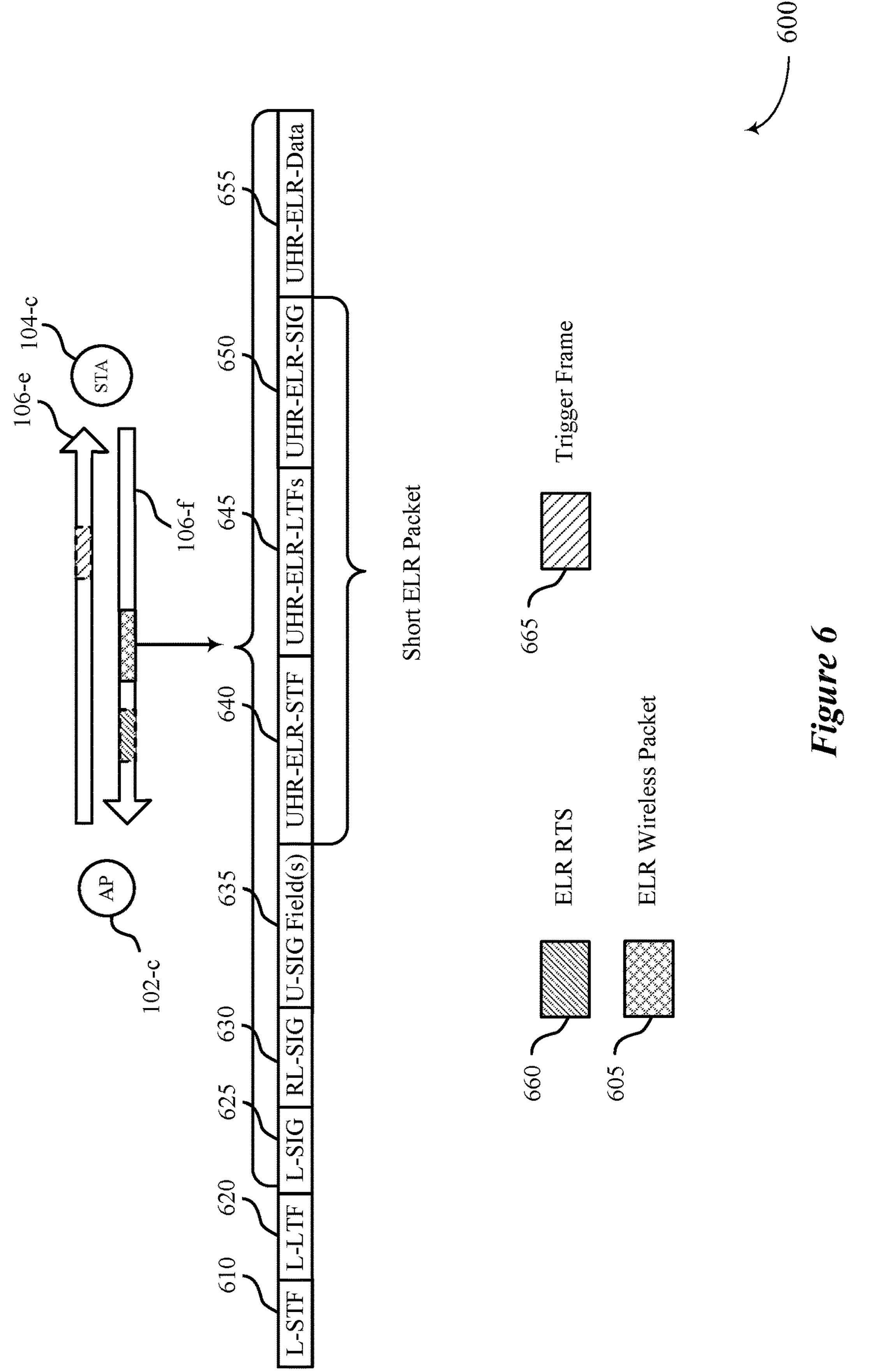
FIG. 6 shows an example of a signaling diagram that supports ELR wireless packet transmission in accordance with a narrow bandwidth ELR wireless packet design.

FIG. 6 shows an example of a signaling diagram 600 that supports ELR wireless packet transmission. In some implementations, the signaling diagram 600 may implement aspects of the wireless communication network 100, the PDU 200, and the PPDU 300. The signaling diagram 600 illustrates communications between one or more APs, such as an AP 102-*c*, and/or one or more STAs, such as a STA 104-*c*. The AP 102-*c* may be an example of an AP 102 described with reference to FIG. 1. The STA 104-*c* may be an example of a STA 104 described with reference to FIG. 1.

In some implementations, an AP 102-*c* may transmit wireless packets to a STA 104-*c* via a communication link 106-*c*. Similarly, the AP 102-*c* may receive wireless packets from the STA 104-*c* via a communication link 106-*f*. The processes described as being performed by the STA 104-*c* may additionally, or alternatively, be performed at the AP 102-*c*. For example, the signaling described as being sent from the STA 104-*c* to the AP 102-*c* may additionally, or alternatively, be sent from the AP 102-*c* to the STA 104-*c*. Similarly, the signaling described as being sent from the AP 102-*c* to the STA 104-*c* may additionally, or alternatively, be sent from the STA 104-*c* to the AP 102-*c*.

In some WLANs, one or more wireless devices, such as wireless STAs 104 and/or wireless APs 102, may extend a distance, or coverage range, over which wireless coverage is provided. The coverage range may be a distance to which an AP 102, such as the AP 102-*c*, provides service to one or more STAs 104, such as the STA 104-*c*. For example, the coverage range may be extended in an uplink direction. In some implementations, if the STA 104-*c* exceeds a threshold distance from the AP 102-*c*, the STA 104-*c* may be outside of the coverage range. The threshold distance may depend on how far signaling between the STA 104-*c* and the AP 102-*c* reliably travels. The wireless devices may operate using a relatively low frequency band, such as a frequency band below 2.4 GHz, rather than a higher frequency band, such as a 5 GHz or 6 GHz frequency band, because the lower frequency band may use a longer wave, which may improve the coverage range and provide improved transmission through objects. Such wireless communications systems may be referred to as LR wireless communications systems. However, one or more wireless devices may still be outside of the coverage range of an LR wireless communications system. Further, the data rate of the communications in the LR wireless communications system may be relatively low due to slower transmission time using longer waves, which may cause latency and relatively low throughput when compared with a OFDM-based system that uses the same or a higher frequency band.

In some implementations, to extend a coverage range for the LR wireless communications system, an AP 102-*c*, a STA 104-*c*, or both may update a wireless packet design for the LR system, where the resulting wireless packet may be referred to as an ELR wireless packet 605. The ELR wireless packet 605 may have a preamble with one or more fields and a data field 655, which may be referred to as a UHR-ELR-data field. An ELR wireless packet 605 may provide for increased extended range in an uplink direction when compared with existing LR wireless packet protocols to improve one or more relatively power imbalances between uplink and downlink. For example, the extended range mode for uplink may mitigate a 10 dB power imbalance between uplink and downlink. Some of the power imbalance may be from regulations (for example, 6 dB) and some of the power different may account for different PAs used by AP STAs 104 and non-AP STAs (for example, 4 dB). The extended range mode for uplink may be applicable to frequency bands that are at least 2.4 GHz or higher in a frequency domain (for example, 2.4 GHz, 5 GHz, and 6 GHz frequency bands). In some implementations, the AP 102-*c* may include two or more times as many antennas as a client, such that an uplink direction may include more combining gain (for example, 3 dB more). By solving the uplink and downlink power imbalance, a range for uplink transmission may be extended (for example, a 6 dB to 7 dB range extension for uplink).

In some implementations, a wireless device may detect an EHT or UHR wireless packet 605 based on an RL-SIG field. Techniques described herein provide for an ELR mode indication to improve detection and range extension as compared with RL-SIG detection schemes for regular EHT or UHR packets. In some implementations, the STA 104-*c* may apply an additional fixed large CFO to a field in a preamble of the ELR wireless packet 605, such as to the L-STF 610 or the UHR-ELR-STF 640. The CFO may be a relatively large CFO that is larger than a threshold CFO (for example, a maximum 280 kHz CFO from crystal imperfection). By adding a frequency offset (for example, a 625 kHz offset which may be a maximum pull-in range of L-STF, or some other value) based on a pull-in range of the L-STF 610, on top of a random CFO, a receiving device, such as the AP 102-*c*, may detect the relatively large CFO using coarse CFO estimation and may determine the packet is an ELR wireless packet 605 accordingly.

In some other implementations, the STA 104-*c* may transmit the ELR wireless packet 605 with a signature sequence for ELR applied to the UHR-ELR-LTF 645. A receiving device, such as the AP 102-*c*, may perform hypothesis testing to detect the unique signature sequence and declare the packet to be an ELR wireless packet 605. In some other implementations, the STA 104-*c* may transmit the ELR wireless packet 605 with repetition of the L-SIG field 625 for ELR detection. For example, the L-SIG field 625 may include the same content and may be repeated four or more times to indicate that the packet is an ELR wireless packet 605.

In some other implementations, to support ELR mode indication, the STA 104-*c* may modify the L-SIG field 625 with new content and/or modulation and may maintain a same processing timeline as legacy fields. For example, the L-SIG field 625 and RL-SIG field 630 may be transmitted according to MCS15 or a FD duplication for a total of four repetitions. Each L-SIG field 625 may convey 12 bits. The content of the L-SIG field 625 may include, for example, a first quantity of bits for CRC (for example, two bits, such as bits 16-17), the six tail bits, such as bits 18-23, and a second quantity of bits (for example, four bits, such as bits 12-15) for ELR mode indication and other information to be signaled early, or for reduced PAPR. The content for bits 12-23 of the L-SIG 625 may be duplicated over a first set of bits 0-11, in some implementations. Such an L-SIG 625 modification may facilitate early indication of ELR mode for an ELR receiver.

In some implementations, to extend a coverage range for the LR wireless communications system, an AP 102-*c*, a STA 104-*c*, or both may update a wireless packet design for the LR system, where the resulting wireless packet may be referred to as an ELR wireless packet 605. In some implementations, the updated ELR wireless packet 605 may be backward compatible with a EHT PPDU and earlier generations. The ELR wireless packet 605 may include an L-STF 610, an L-LTF 620, an L-SIG field 625, an RL-SIG field 630, one or more U-SIG fields 635 (for example, U-SIG1 and U-SIG2), a UHR-ELR-STF 640, one or more UHR-ELR-LTFs 645, one or more UHR-ELR-SIG fields 650 (for example, MCS14 or four repetitions), a UHR-ELR-data field 655 (for example, MCS14 or for repetitions), or any combination thereof. A receiving device (an intended receiver) may carry multiple hypotheses until the receiving device decodes the UHR-ELR-SIG field 650.

The wireless packet design described herein may reduce parallel decision time. In some implementations, the transmitting device may apply a relatively large CFO to the L-STF 610 or the UHR-ELR-STF 640 for ELR indication. Additionally, or alternatively, the transmitting device may repeat the L-SIG field 625 four times as an ELR mode indication, followed by the U-SIG field(s) 635 for other ELR-related parameters. The RL-SIG field 630 detection and decoding results may not be reliable at some relatively low SNRs. Following the RL-SIG field 630, the receiving device may utilize a parallel path to continue combining for the L-SIG field 625 while keeping track of other possible modes. In some implementations, modulation of the U-SIG field(s) 635 may be two times repetition with MCS15 or four times repetition with MCS0. The L-SIG field 625 with four times repetition may be differentiated from the U-SIG field 635 with two times or four times repetition. A content check in the L-SIG field 625 may assist with such differentiation. For example, six tail bits may be all zeros and the rate field of the L-SIG 625 may be 6 Mbps, or the like.

In some other implementations, the ELR wireless packet 605 may be a relatively short greenfield ELR packet design that includes a UHR-ELR-STF 640, a UHR-ELR-LTF 645, and a UHR-ELR-SIG field 650. In this implementation, the UHR-ELR-STF 640 may be associated with 3 dB boosting or with 3 dB boosting and a relatively large frequency offset such as, for example, 625 kHz, or some other offset, for classification and ELR indication. The UHR-ELR-LTF 645 may be repeated two times with 3 dB boosting, or may be repeated four times. In some implementations, a unique signature sequence may be applied to the UHR-ELR-LTF 645 with two times repetition or four times repetition for classification and ELR indication. If the UHR-ELR-STF 640 includes an additional CFO for ELR indication, the UHR-ELR-SIG field 650 may be with any of the following repetition schemes: four times repetition with MCS0, two times repetition with MCS15, or MCS14 like four times FD duplication. If the UHR-ELR-STF 640 does not include an ELR indication, the UHR-ELR-SIG field 650 may be repeated four times for ELR indication with updated content for ELR information, or the UHR-ELR-SIG field 650 may be repeated two times with MCS15, with content updated for ELR information, and the ELR wireless packet 605 may additionally include one or more SIG fields (for example, SIG1 and SIG2). The relatively short greenfield ELR packet design may provide for relatively early mode detection and decision.

In some other implementations, the ELR wireless packet 605 may be a relatively short greenfield ELR packet design with a spoofing legacy preamble. For example, in addition to the UHR-ELR-STF 640, the UHR-ELR-LTF 645, and the UHR-ELR-SIG field 650, the ELR wireless packet 605 may include a preamble up to the RL-SIG field 630 or the U-SIG field 635. The spoofing preamble may provide compatibility with one or more other types of wireless devices. For example, the one or more other types of wireless devices may decode the preamble to obtain deferral information. Additionally, or alternatively, the ELR wireless packet 605 may be a relatively short greenfield ELR packet design with data. For example, in addition to the UHR-ELR-STF 640, the UHR-ELR-LTF 645, and the UHR-ELR-SIG field 650, the ELR wireless packet 605 may include a data field, such as the UHR-ELR-data field 655. The ELR wireless packet 605 may or may not include an UHR-ELR-LTF 645 in addition to the data depending on a level of boosting and/or accuracy associated with the transmission.

In some implementations, an uplink ELR wireless packet 605 may be subject to one or more protection issues. For example, a legacy preamble coverage may be relatively limited. In some systems, STAs other than the STA 104-*c* may hear from the AP 102-*c* but not the STA 104-*c*, which may be an ELR STA 104-*c*, even with backward compatible ELR PPDU. The ELR STA 104-*c* may be within a coverage area of the AP 102-*c*, but the legacy preamble of the ELR STA 104-*c* may support a shorter range than the AP 102-*c* (for example, 10 dB shorter range than the AP 102-*c*), which may result in a hidden node scenario from other STAs. In such cases, relatively long ELR data transmissions may be interrupted. Other STAs, such as non-ELR STAs, may utilize RTS and CTS signaling to obtain protection for wireless packets. However, the ELR STA 104-*c* may utilize an ELR RTS 660 (a modified RTS for ELR), which may be a relatively short control frame to request protection by the AP 102-*c*.

Techniques described herein provide for the STA 104-*c* to transmit a relatively short ELR single user (SU) request with a downlink trigger and an uplink trigger based (TB) PPDU with a relatively low data rate for the ELR STA 104-*c*. For example, the STA 104-*c* may initiate the procedure by transmitting the ELR RTS 660 to seek protection for a long ELR data packet of the STA 104-*c*. The ELR RTS 660 may be a short ELR SU request. The relatively short request packet may reduce a probability and potential loss due to interference from hidden nodes. By sending the short ELR RTS 660 with the ELR SU request, the STA 104-*c* may initiate protection, by the AP 102-*c*, of the ELR wireless packet 605 to be transmitted by the STA 104-*c*. The short request may include an ID of the STA 104-*c* (for example, 11 bits, or some other ID length), information associated with a BSS (six bits, or some other quantity of bits for BSS color), a requested duration (10 bits, or some other quantity of bits), or any combination thereof. The short request may thereby include around 40 bits with at least 27 bits for the information, six tail bits, and six CRC bits. Using four times repetition, the request may have a duration of around 28 to 32 microseconds, as an example.

The ELR RTS 660 may be transmitted via a greenfield ELR packet that includes, for example, the UHR-ELR-STF 640, the UHR-ELR-LTF 645, and the UHR-ELR-SIG field 650, with or without one or more other preamble fields and/or the data field, as described herein. Additionally, or alternatively, the ELR RTS 660 may be transmitted via a greenfield ELR MAC frame with a relatively small data payload. The request information may be transmitted via the SIG field(s) or via the SIG field(s) and data field. If a greenfield ELR packet is used, the packet may include the STF with a CFO offset, an LTF, and SIG fields with MCS14, and the short request may occupy a duration of around 32 microseconds, as an example. A greenfield ELR MAC frame may occupy a slightly longer duration than the greenfield ELR packet, in some examples.

The AP 102-*c* may transmit the downlink trigger frame 665 in response to the ELR RTS 660. The downlink trigger frame 665 may inform bystanders (other wireless devices) to defer for the following ELR data packet and may inform the STA 104-*c* to transmit its ELR data under the protection provided by the downlink trigger. The STA 104-*c* (initiator STA) may subsequently transmit an uplink TB PPDU with a relatively low data rate for ELR under the protection of the trigger frame 665.

Figure 7:
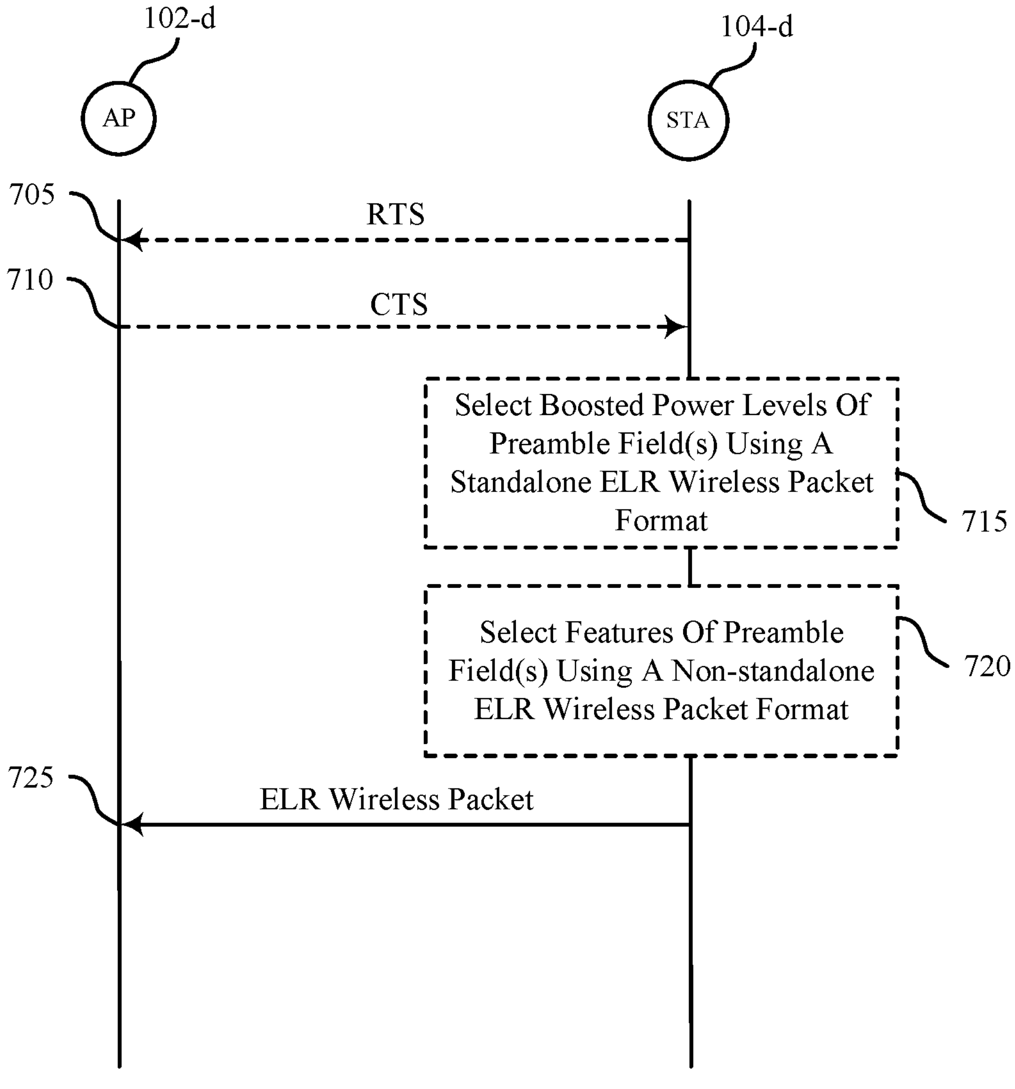
FIG. 7 shows an example of a process flow illustrating example processes that support ELR wireless packet design.

FIG. 7 shows an example of a process flow 700 illustrating example processes that support ELR wireless packet design. In some implementations, the process flow 700 may implement or may be implemented by aspects of the wireless communication network 100, the PDU 200, the PPDU 300, and the signaling diagram 400. For example, the process flow 700 illustrates communications between a STA 104-*d* and an AP 102-*d*, which may represent aspects of corresponding devices as described with reference to FIGS. 1-6. In some implementations, the STA 104-*d* may boost one or more power levels of fields in a preamble of an ELR wireless packet, may repeat fields of the ELR wireless packet, or both to increase a data rate and/or efficiency for an ELR wireless communications system.

In the following description of the process flow 700, the operations between the AP 102-*d* and the STA 104-*d* may be performed in different orders or at different times. Some operations also may be left out of the process flow 700, or other operations may be added. Although the AP 102-*d* and the STA 104-*d* are shown performing the operations of the process flow 700, some aspects of some operations also may be performed by one or more other wireless communication devices. For example, the actions performed by the STA 104-*d* may additionally, or alternatively, be performed by the AP 102-*d*.

In some implementations, at 705, the STA 104-*d* may transmit a RTS to an AP 102-*d*. The RTS may be a request for the STA 104-*d* to transmit an ELR wireless packet that includes a preamble and a data field. The RTS may represent an example of an RTS 440 as described with reference to FIG. 4 or an ELR RTS 660 as described with reference to FIG. 6. The preamble may include one or more fields, such as a STF, LTF, one or more SIG fields, and any other fields. The SIG fields may be a simplified SIG field that indicates whether the ELR wireless packet is for a single user or not, coding information, a length of the ELR wireless packet, an MCS, a bandwidth size, a resource unit size, or any combination thereof. The STA 104-*d* may transmit the ELR wireless packet using OFDM communication techniques.

In some implementations, at 710, the STA 104-*d* may receive a CTS from the AP 102-*d* in response to the RTS. In some implementations, the STA 104-*d* may receive a trigger frame from the AP 102-*d* in response to the RTS. For example, if the RTS is an ELR RTS, as described with reference to FIG. 6, the AP 102-*d* may transmit a trigger frame that indicates protection of a following ELR wireless packet.

In some implementations, at 715, the STA 104-*d* may select one or more boosted power levels for the fields of the preamble, where the STA 104-*d* uses a standalone ELR wireless packet format. The STA 104-*d* may select the power levels to achieve a threshold power level for a target data rate for the ELR communications. In some implementations, the STA 104-*d* may select a duration of the fields of the preamble of the ELR wireless packet. Specifically, the STA 104-*d* may select a duration of the STF that accommodates detection of the ELR wireless packet and an AGC of the ELR wireless packet. Additionally, or alternatively, the STA 104-*d* may select a STF sequence, such as a Barker sequence, a repeated Golay sequence, a Zadoff-Chu sequence, or any combination thereof. In some implementations, the STA 104-*d* may select a boosted power level for transmitting the fields of the preamble to achieve a target data rate for the ELR wireless packet. In some implementations, the STA 104-*d* may transmit a standalone ELR wireless packet without receiving a CTS from the AP 102-*d*.

In some implementations, at 720, the STA 104-*d* may select one or more features of the preamble fields, where the STA 104-*d* uses a non-standalone ELR wireless packet format. In some implementations, the STA 104-*d* may use legacy preambles. In some implementations, the STA 104-*d* may use 802.11a like greenfield preamble for ELR transmission. In some implementations, the STA 104-*d* may wait to transmit a non-standalone ELR wireless packet until receiving a CTS from the AP 102-*d*.

At 725, the STA 104-*d* may transmit the ELR wireless packet to the AP 102-*d*. In some implementations, the STA 104-*d* may transmit the ELR wireless packet using the selected power levels, which may be boosted power levels, for respective fields. For example, the STA 104-*d* may boost the power levels of the STF and/or LTF fields in the preamble of the ELR wireless packet. Additionally, or alternatively, the STA 104-*d* may transmit fields of the preamble in accordance with a numerical quantity of repetitions. For example, the STA 104-*d* may transmit the SIG field multiple times in accordance with the numerical quantity of repetitions. The power levels and the numerical quantity of repetitions may be dedicated to ELR communications, such that the power levels and the numerical quantity of repetitions include values that improve a data rate for the signaling without compromising the coverage range.

In some implementations, the STA 104-*d* may transmit the data field of the ELR wireless packet based on using a numerical quantity of repetitions, an interleaving parameter, a code rate, an MCS scheme, or any combination thereof. The MCS scheme may be MCS0 and the STA 104-*d* may repeat the data field 4 times or 3 times.

Figure 8:
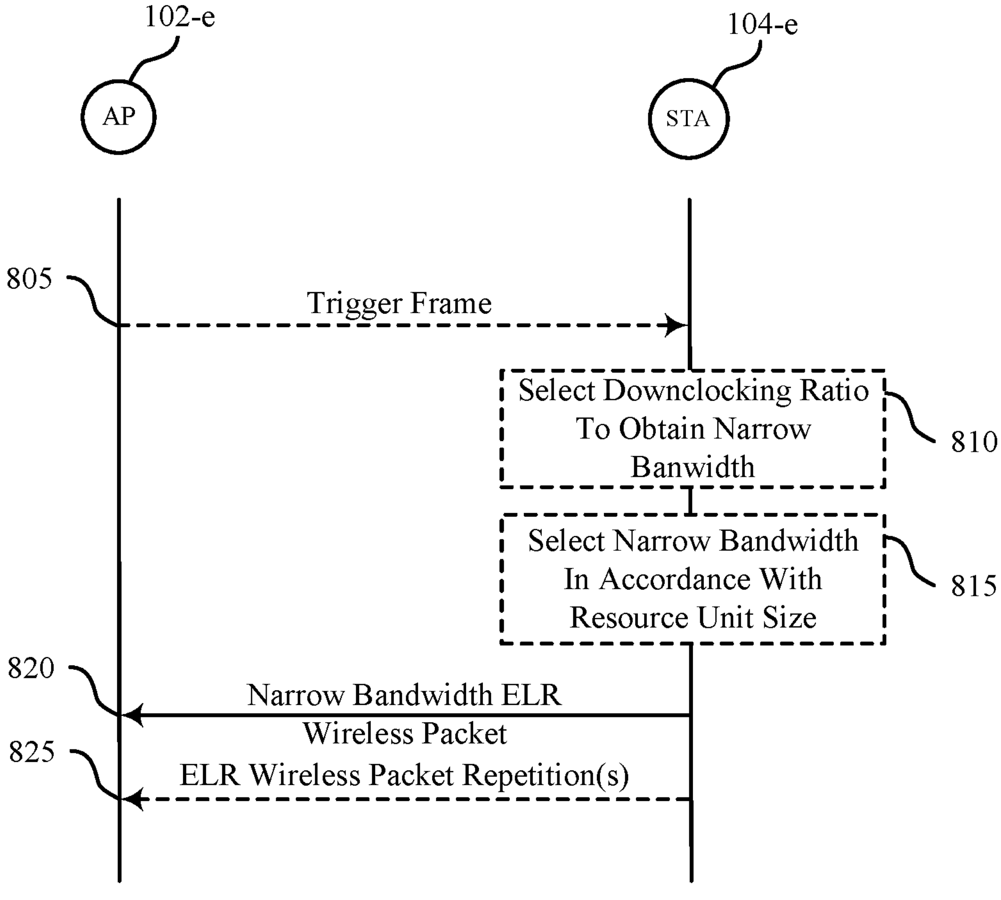
FIG. 8 shows an example of a process flow illustrating example processes that support narrow bandwidth ELR wireless packet design.

FIG. 8 shows an example of a process flow 800 illustrating example processes that support narrow bandwidth ELR wireless packet design. In some implementations, the process flow 800 may implement or may be implemented by aspects of the wireless communication network 100, the PDU 200, the PPDU 300, and the signaling diagram 500. For example, the process flow 800 illustrates communications between a STA 104-*e* and an AP 102-*e*, which may represent aspects of corresponding devices as described with reference to FIGS. 1-7. In some implementations, the STA 104-*e* may transmit an ELR wireless packet using a narrow bandwidth, may repeat the ELR wireless packet, or both to extend a coverage range for an ELR wireless communications system.

In the following description of the process flow 800, the operations between the AP 102-*e* and the STA 104-*e* may be performed in different orders or at different times. Some operations also may be left out of the process flow 800, or other operations may be added. Although the AP 102-*e* and the STA 104-*e* are shown performing the operations of the process flow 800, some aspects of some operations also may be performed by one or more other wireless communication devices. For example, the actions performed by the STA 104-*e* may additionally, or alternatively, be performed by the AP 102-*e*.

In some implementations, at 805, the STA 104-*e* may receive signaling that triggers transmission of an ELR wireless packet. The signaling may include a trigger frame. In some other implementations, the STA 104-*e* may transmit the ELR wireless packet without receiving a trigger frame.

The ELR wireless packet may have a preamble and a data field, where the preamble has one or more fields. The one or more fields may include a STF, an LTF, one or more SIG fields, or any combination thereof. The SIG fields may be a simplified SIG field that indicates whether the ELR wireless packet is for a single user or not, coding information, a length of the ELR wireless packet, an MCS, a bandwidth size, a resource unit size, or any combination thereof. In some implementations, the STA 104-*e* may select a duration of the STF or one or more power levels for boosting the transmit power of the STF, the LTF, or both in accordance with detection of the ELR wireless packet and an AGC of the ELR wireless packet. The STA 104-*e* may transmit the ELR wireless packet using OFDM communication techniques.

In some implementations, at 810, the STA 104-*e* may select a downclocking ratio for downclocking the transmit frequency of the ELR wireless packet. The STA 104-*e* may select a downclocking ratio that satisfies a CFO correction threshold value, a range gain threshold value, or both. The downclocking ratio may provide for the STA 104-*e* to downclock a transmit frequency from a higher frequency to a lower frequency, such as 20 MHz to 5 MHz with a downclocking ratio of 4.

In some implementations, at 815, the STA 104-*e* may select the bandwidth for the ELR wireless packet to be the same as a resource unit size of the preamble and data field.

At 820, the STA 104-*e* may transmit the ELR wireless packet to the AP 102-*e*. The STA 104-*e* may use a narrow bandwidth to transmit the ELR wireless packet, such as in accordance with the selected downclocking ratio and/or the selected resource unit size. In some implementations, the STA 104-*e* may transmit the ELR wireless packet in accordance with a frequency hopping scheme that satisfies a PSD threshold for the ELR wireless packet. The STA 104-*e* may transmit the ELR wireless packet with multiple other transmissions in an OFDMA transmission. In some implementations, the OFDMA transmission may include transmissions that have a same downclocking ratio. In some implementations, the OFDMA transmission may include non-ELR and ELR transmissions, where the STA 104-*e* may select the resource unit size for the ELR wireless packet transmission and may have same symbol duration and CP length as other WLAN communications. In some implementations, the STA 104-*e* may transmit the data field using a portion of bandwidth and an MCS to obtain a target coverage range.

The STA 104-*e* may transmit the preamble using an increased frequency spacing between one or more resources of at least one field if a CFO correction value fails to satisfy a threshold CFO correction value.

The STA 104-*e* may boost one or more power levels when transmitting the preamble, such as for transmitting the STF and/or LTF of the preamble, to achieve a target coverage range.

In some implementations, the STA 104-*e* may repeat, or duplicate, one or more fields of the preamble using a tone plan and for a duration in accordance with the resource unit size. The tone plan may specify one or more frequency indices for repetitions of the one or more fields of the preamble.

At 825, the STA 104-*e* may transmit one or more ELR wireless packet repetitions, such as in the frequency domain, the time domain, or both to accommodate a target coverage range.

Figure 9:
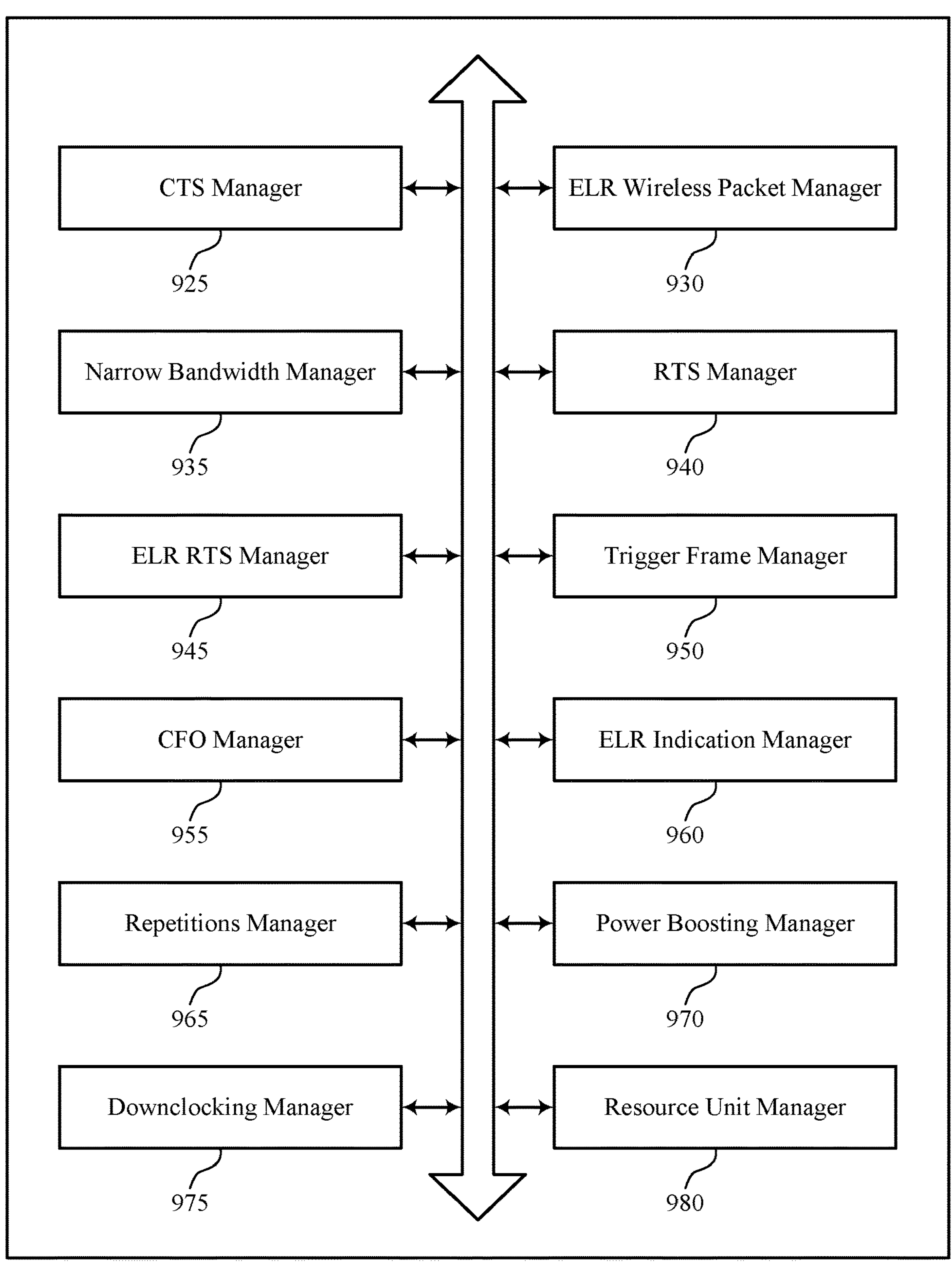
FIG. 9 shows a block diagram of an example wireless communication device that supports ELR wireless packet design.

FIG. 9 shows a block diagram of an example wireless communication device 900 that supports extended long range wireless packet design. In some examples, the wireless communication device 900 is configured to perform the processes 1100-1400 described with reference to FIGS. 11-14, respectively. The wireless communication device 900 may include one or more chips, SoCs, chipsets, packages, components or devices that individually or collectively constitute or include a processing system. The processing system may interface with other components of the wireless communication device 900, and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the wireless communication device 900 may transmit the information output from the chip. In such an example, the second interface may refer to an interface between the processing system of the chip and a reception component, such that the wireless communication device 900 may receive information that is then passed to the processing system. In some such examples, the first interface also may obtain information, such as from the transmission component, and the second interface also may output information, such as to the reception component.

The processing system of the wireless communication device 900 includes processor (or "processing") circuitry in the form of one or multiple processors, microprocessors, processing units (such as central processing units (CPUs), graphics processing units (GPUs) or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or ROM, or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally, or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

In some examples, the wireless communication device 900 can configurable or configured for use in a STA, such as the STA 904 described with reference to FIG. 9. In some other examples, the wireless communication device 900 can be a STA that includes such a processing system and other components including multiple antennas. The wireless communication device 900 is capable of transmitting and receiving wireless communications in the form of, for example, wireless packets. For example, the wireless communication device 900 can be configurable or configured to transmit and receive packets in the form of physical layer PPDUs and MPDUs conforming to one or more of the IEEE 802.99 family of wireless communication protocol standards. In some other examples, the wireless communication device 900 can be configurable or configured to transmit and receive signals and communications conforming to one or more 3GPP specifications including those for 5G NR or 6G. In some examples, the wireless communication device 900 also includes or can be coupled with one or more application processors which may be further coupled with one or more other memories. In some examples, the wireless communication device 900 further includes a user interface (UI) (such as a touchscreen or keypad) and a display, which may be integrated with the UI to form a touchscreen display that is coupled with the processing system. In some examples, the wireless communication device 900 may further include one or more sensors such as, for example, one or more inertial sensors, accelerometers, temperature sensors, pressure sensors, or altitude sensors, that are coupled with the processing system.

The wireless communication device 900 includes a CTS manager 925, an ELR wireless packet manager 930, a narrow bandwidth manager 935, an RTS manager 940, an ELR RTS manager 945, a trigger frame manager 950, a CFO manager 955, an ELR indication manager 960, a repetitions manager 965, a power boosting manager 970, a downclocking manager 975, and a resource unit manager 980. Portions of one or more of the CTS manager 925, the ELR wireless packet manager 930, the narrow bandwidth manager 935, the RTS manager 940, the ELR RTS manager 945, the trigger frame manager 950, the CFO manager 955, the ELR indication manager 960, the repetitions manager 965, the power boosting manager 970, the downclocking manager 975, and the resource unit manager 980 may be implemented at least in part in hardware or firmware. For example, one or more of the CTS manager 925, the ELR wireless packet manager 930, the narrow bandwidth manager 935, the RTS manager 940, the ELR RTS manager 945, the trigger frame manager 950, the CFO manager 955, the ELR indication manager 960, the repetitions manager 965, the power boosting manager 970, the downclocking manager 975, and the resource unit manager 980 may be implemented at least in part by at least a processor or a modem. In some examples, portions of one or more of the CTS manager 925, the ELR wireless packet manager 930, the narrow bandwidth manager 935, the RTS manager 940, the ELR RTS manager 945, the trigger frame manager 950, the CFO manager 955, the ELR indication manager 960, the repetitions manager 965, the power boosting manager 970, the downclocking manager 975, and the resource unit manager 980 may be implemented at least in part by a processor and software in the form of processor-executable code stored in memory.

The wireless communication device 900 may support wireless communication in accordance with examples as disclosed herein. The CTS manager 925 is configurable or configured to receive an indication to transmit an ELR wireless packet including a preamble and a data field, the ELR wireless packet associated with a frequency band that is at least 2.4 gigahertz or higher in a frequency domain and associated with OFDM communications. The ELR wireless packet manager 930 is configurable or configured to transmit, in accordance with the indication and a data rate associated with ELR communications, the ELR wireless packet using one or more power levels for one or more respective fields of the preamble and a first numerical quantity of repetitions for at least one field of the preamble, the one or more power levels and the first numerical quantity of repetitions dedicated to the ELR communications, the data rate less than a threshold data rate associated with second communications different than the ELR communications.

In some examples, the RTS manager 940 is configurable or configured to transmit a request to transmit the ELR wireless packet, the indication being received in response to transmitting the request.

In some examples, the ELR RTS manager 945 is configurable or configured to transmit a request to transmit the ELR wireless packet, a duration of the request associated at least in part with the ELR communications. In some examples, the trigger frame manager 950 is configurable or configured to receive the indication in response to the request, the indication including a trigger frame that indicates protection for the ELR wireless packet, the ELR wireless packet including a trigger-based transmission associated at least in part with the trigger frame.

In some examples, the ELR RTS manager 945 is configurable or configured to transmit, via the request to transmit the ELR wireless packet, an identifier of the wireless station, information associated with a basic service set, a duration for the protection for the ELR wireless packet, or any combination thereof.

In some examples, the ELR RTS manager 945 is configurable or configured to transmit the request via a wireless packet including at least a short training field, a long training field, and a signal field.

In some examples, the CFO manager 955 is configurable or configured to apply a carrier frequency offset to the at least one field of the preamble, the carrier frequency offset associated at least in part with the indication.

In some examples, the ELR indication manager 960 is configurable or configured to transmit, via the at least one field of the preamble, a signature sequence, the signature sequence associated at least in part with the indication.

In some examples, the first numerical quantity of repetitions for the at least one field of the preamble be at least four repetitions, the at least one field including a signal field.

In some examples, each repetitions of the at least four repetitions include a subset of a set of bits associated at least in part with an indication of the ELR communications.

In some examples, the repetitions manager 965 is configurable or configured to transmit the data field in accordance with a second numerical quantity of repetitions, an interleaving parameter, a code rate, a modulation scheme, or any combination thereof, the second numerical quantity of repetitions, the interleaving parameter, the code rate, and the modulation scheme associated with the data rate.

In some examples, the modulation scheme include a modulation and coding scheme 0 (MCS0) and the second numerical quantity of repetitions includes four repetitions or the second numerical quantity of repetitions includes three repetitions.

In some examples, the power boosting manager 970 is configurable or configured to boost the one or more power levels in accordance with a threshold power level value for the data rate.

In some examples, the one or more respective fields include a short training field, a long training field, or both.

In some examples, the at least one field include one or more signal fields that indicate whether the ELR wireless packet is for a single user or not, coding information, a length of the ELR wireless packet, a modulation and coding scheme (MCS), a bandwidth size, a resource unit size, or any combination thereof.

Additionally, or alternatively, the wireless communication device 900 may support wireless communication in accordance with examples as disclosed herein. The narrow bandwidth manager 935 is configurable or configured to transmit, in accordance with a data rate associated with ELR communications and via a frequency band that is at least 2.4 gigahertz or higher in a frequency domain, an ELR wireless packet that includes a preamble and a data field, the preamble including a short training field, a long training field, or both dedicated to the ELR communications, a duration of the short training field associated with detection of the ELR wireless packet and an automatic gain control for the ELR wireless packet, the preamble and the data field of the ELR wireless packet associated with a first bandwidth that is less than a threshold bandwidth for the ELR communications.

In some examples, the power boosting manager 970 is configurable or configured to transmit the short training field, the long training field, or both in accordance with respective boosted power levels, the respective boosted power levels associated with a threshold power level value for the data rate.

In some examples, the trigger frame manager 950 is configurable or configured to receive signaling that triggers transmission of the ELR wireless packet, the ELR wireless packet transmitted in accordance with the signaling.

In some examples, the downclocking manager 975 is configurable or configured to transmit the ELR wireless packet in accordance with a downclocking ratio that downclocks a bandwidth of the ELR wireless packet from a second bandwidth to the first bandwidth.

In some examples, the ELR wireless packet be associated with OFDM communications. In some examples, the OFDM communications include a set of multiple ELR wireless packets including the ELR wireless packet in accordance with the set of multiple ELR wireless packets being associated with the downclocking ratio.

In some examples, the repetitions manager 965 is configurable or configured to transmit the ELR wireless packet in accordance with a numerical quantity of repetitions in frequency associated with a target coverage range corresponding to the ELR communications.

In some examples, the downclocking manager 975 is configurable or configured to select the downclocking ratio in accordance with a carrier frequency offset correction value satisfying a threshold carrier frequency offset correction value, a range gain value satisfying a threshold range gain value, or both.

In some examples, the CFO manager 955 is configurable or configured to transmit the preamble in accordance with an increased frequency spacing between one or more resources of at least one field of one or more fields of the preamble in accordance with a carrier frequency offset correction value failing to satisfy a threshold carrier frequency offset correction value.

In some examples, the resource unit manager 980 is configurable or configured to select the first bandwidth for the data field in accordance with a resource unit size corresponding to the preamble and the data field.

In some examples, the ELR wireless packet be associated with OFDM communications. In some examples, the OFDM communications include the ELR wireless packet and a set of multiple wireless packets in accordance with the resource unit size and a tone plan associated with the ELR wireless packet and the set of multiple wireless packets.

In some examples, the preamble indicate whether the ELR wireless packet is for a single user or not, coding information, a length of the ELR wireless packet, a modulation and coding scheme (MCS), a bandwidth size, the resource unit size, or any combination thereof.

In some examples, one or more fields of the preamble be repeated in accordance with a tone plan and a duration in accordance with the resource unit size, the tone plan associated with one or more resource indices for repetitions of the one or more fields of the preamble.

In some examples, the preamble include a short training field, a long training field, or both dedicated to the ELR communications, a duration of the short training field associated with detection of the ELR wireless packet and an automatic gain control for the ELR wireless packet.

In some examples, the preamble include a short training field dedicated to the ELR communications, a tone spacing associated with the short training field associated at least in part with the ELR communications.

Figure 10:
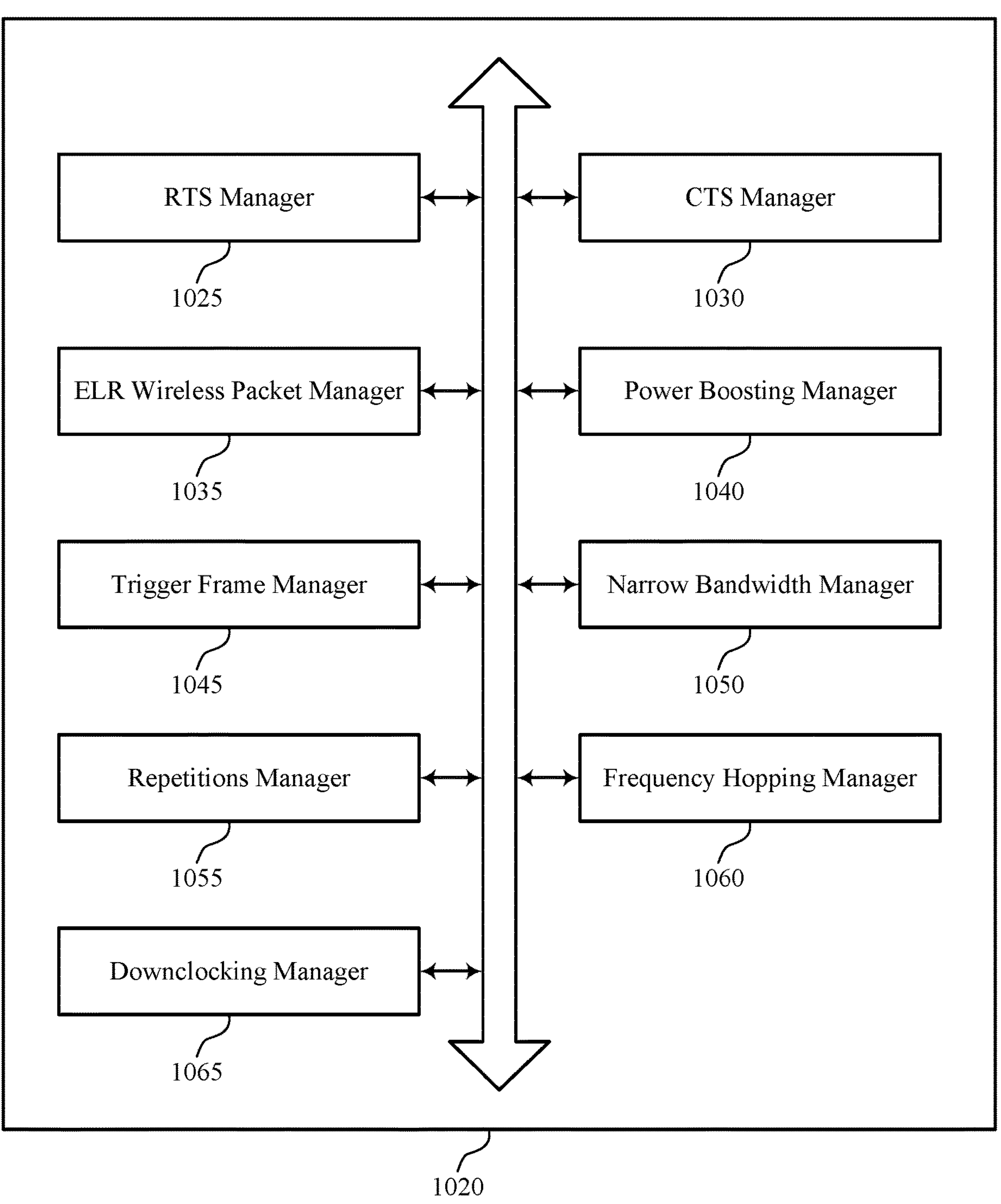
FIG. 10 shows a block diagram of an example wireless communication device that supports ELR wireless packet design.

FIG. 10 shows a block diagram of an example wireless communication device 1000 that supports ELR wireless packet design. In some examples, the wireless communication device 1000 is configured to perform the processes 1500-1700 described with references to FIGS. 15-17, respectively. The wireless communication device 1000 may include one or more chips, SoCs, chipsets, packages, components or devices that individually or collectively constitute or include a processing system. The processing system may interface with other components of the wireless communication device 1000, and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the wireless communication device 1000 may transmit the information output from the chip. In such an example, the second interface may refer to an interface between the processing system of the chip and a reception component, such that the wireless communication device 1000 may receive information that is then passed to the processing system. In some such examples, the first interface also may obtain information, such as from the transmission component, and the second interface also may output information, such as to the reception component.

The processing system of the wireless communication device 1000 includes processor (or "processing") circuitry in the form of one or multiple processors, microprocessors, processing units (such as central processing units (CPUs), graphics processing units (GPUs) or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or ROM, or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally, or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

In some examples, the wireless communication device 1000 can configurable or configured for use in an AP, such as the AP 102 described with reference to FIG. 1. In some other examples, the wireless communication device 1000 can be an AP that includes such a processing system and other components including multiple antennas. The wireless communication device 1000 is capable of transmitting and receiving wireless communications in the form of, for example, wireless packets. For example, the wireless communication device 1000 can be configurable or configured to transmit and receive packets in the form of physical layer PPDUs and MPDUs conforming to one or more of the IEEE 802.11 family of wireless communication protocol standards. In some other examples, the wireless communication device 1000 can be configurable or configured to transmit and receive signals and communications conforming to one or more 3GPP specifications including those for 5G NR or 6G. In some examples, the wireless communication device 1000 also includes or can be coupled with one or more application processors which may be further coupled with one or more other memories. In some examples, the wireless communication device 1000 further includes at least one external network interface coupled with the processing system that enables communication with a core network or backhaul network that enables the wireless communication device 1000 to gain access to external networks including the Internet.

The wireless communication device 1000 includes an RTS manager 1025, a CTS manager 1030, an ELR wireless packet manager 1035, a power boosting manager 1040, a trigger frame manager 1045, a narrow bandwidth manager 1050, a repetitions manager 1055, a frequency hopping manager 1060, and a downclocking manager 1065. Portions of the one or more of the RTS manager 1025, the CTS manager 1030, the ELR wireless packet manager 1035, the power boosting manager 1040, the trigger frame manager 1045, the narrow bandwidth manager 1050, the repetitions manager 1055, the frequency hopping manager 1060, and the downclocking manager 1065 may be implemented at least in part in the hardware or firmware. For example, one or more of the RTS manager 1025, the CTS manager 1030, the ELR wireless packet manager 1035, the power boosting manager 1040, the trigger frame manager 1045, the narrow bandwidth manager 1050, the repetitions manager 1055, the frequency hopping manager 1060, and the downclocking manager 1065 may be implemented at least in part by a modem. In some implementations, at least some of the RTS manager 1025, the CTS manager 1030, the ELR wireless packet manager 1035, the power boosting manager 1040, the trigger frame manager 1045, the narrow bandwidth manager 1050, the repetitions manager 1055, the frequency hopping manager 1060, and the downclocking manager 1065 are implemented at least in part by a processor and as software stored in memory. For example, portions of one or more of the RTS manager 1025, the CTS manager 1030, the ELR wireless packet manager 1035, the power boosting manager 1040, the trigger frame manager 1045, the narrow bandwidth manager 1050, the repetitions manager 1055, the frequency hopping manager 1060, and the downclocking manager 1065 can be implemented as non-transitory instructions (or "code") executable by the processor to perform the functions or operations of the respective module.

The RTS manager 1025 is capable of, configured to, or operable to support a means for receiving a request for transmission of an ELR wireless packet that includes a preamble and a data field, the ELR wireless packet associated with OFDM communications. The CTS manager 1030 is capable of, configured to, or operable to support a means for transmitting, in response to the request, an indication to transmit the ELR wireless packet. The ELR wireless packet manager 1035 is capable of, configured to, or operable to support a means for receiving, in accordance with the indication, the ELR wireless packet in accordance with one or more power levels for one or more respective fields of the preamble and a first numerical quantity of repetitions for at least one field of the preamble, the one or more power levels and the first numerical quantity of repetitions dedicated to ELR communications.

In some implementations, to support receiving the ELR wireless packet, the repetitions manager 1055 is capable of, configured to, or operable to support a means for receiving the data field in accordance with a second numerical quantity of repetitions, an interleaving parameter, a code rate, a modulation scheme, or any combination thereof, the second numerical quantity of repetitions, the interleaving parameter, the code rate, and the modulation scheme associated with the data rate.

In some implementations, the modulation scheme includes an MCS0 and the second numerical quantity of repetitions includes 4 repetitions or the second numerical quantity of repetitions includes 3 repetitions.

In some implementations, the one or more power levels are boosted in accordance with a threshold power level value for a data rate.

In some implementations, the one or more respective fields include an STF, an LTF, or both.

In some implementations, the at least one field includes one or more signal fields that indicate whether the ELR wireless packet is for a single user or not, coding information, a length of the ELR wireless packet, an MCS, a bandwidth size, a resource unit size, or any combination thereof.

Additionally, or alternatively, the AP 1020 may support wireless communications at a wireless AP in accordance with examples as disclosed herein. The power boosting manager 1040 is capable of, configured to, or operable to support a means for receiving, in accordance with a data rate associated with ELR communications, an ELR wireless packet that includes a preamble and a data field, the preamble including an STF, an LTF, or both dedicated to the ELR communications, a duration of the STF associated with detection of the ELR wireless packet and an AGC of the ELR wireless packet.

In some implementations, the STF is associated with a base sequence, the base sequence including a Barker sequence, a repeated Golay sequence, a Zadoff-Chu sequence, or any combination thereof.

In some implementations, to support receiving the ELR wireless packet, the power boosting manager 1040 is capable of, configured to, or operable to support a means for receiving the STF, the LTF, or both in accordance with respective boosted power levels, the respective boosted power levels associated with a threshold power level value for the data rate.

Additionally, or alternatively, the AP 1020 may support wireless communications at a wireless AP in accordance with examples as disclosed herein. The trigger frame manager 1045 is capable of, configured to, or operable to support a means for transmitting signaling that triggers transmission of an ELR wireless packet that includes a preamble and a data field, the ELR wireless packet associated with OFDM communications. The narrow bandwidth manager 1050 is capable of, configured to, or operable to support a means for receiving, in accordance with the signaling, the ELR wireless packet using a first bandwidth for the preamble and the data field, the first bandwidth dedicated to ELR communications.

In some implementations, the frequency hopping manager 1060 is capable of, configured to, or operable to support a means for receiving the ELR wireless packet in accordance with a frequency hopping scheme that satisfies a power spectral density threshold associated with the ELR wireless packet.

In some implementations, the downclocking manager 1065 is capable of, configured to, or operable to support a means for receiving the ELR wireless packet in accordance with a downclocking ratio that downclocks a bandwidth of the ELR wireless packet from a second bandwidth to the first bandwidth.

In some implementations, the OFDM communications include a set of multiple ELR wireless packets including the ELR wireless packet in accordance with the set of multiple ELR wireless packets being associated with the downclocking ratio.

In some implementations, to support receiving the ELR wireless packet, the repetitions manager 1055 is capable of, configured to, or operable to support a means for receiving the ELR wireless packet in accordance with a numerical quantity of repetitions in frequency associated with a target coverage range corresponding to the ELR communications.

In some implementations, the repetitions manager 1055 is capable of, configured to, or operable to support a means for receiving the data field in accordance with a frequency domain repetition of the data field, a time domain repetition of the data field, or both in accordance with the target coverage range.

In some implementations, the narrow bandwidth manager 1050 is capable of, configured to, or operable to support a means for receiving the data field using a portion of the second bandwidth for the data field in accordance with an MCS.

In some implementations, the preamble includes one or more parameters, and the ELR wireless packet manager 1035 is capable of, configured to, or operable to support a means for receiving the preamble in accordance with an increased frequency spacing between one or more resources of at least one parameter of the one or more parameters in accordance with a carrier frequency offset correction value failing to satisfy a threshold carrier frequency offset correction value.

In some implementations, the OFDM communications include the ELR wireless packet and a set of multiple wireless packets in accordance with a resource unit size corresponding to the preamble and the data field.

In some implementations, the preamble includes an STF, an LTF, or both dedicated to the ELR communications, a duration of the STF associated with detection of the ELR wireless packet and an AGC of the ELR wireless packet.

In some implementations, to support receiving the ELR wireless packet, the power boosting manager 1040 is capable of, configured to, or operable to support a means for receiving one or more respective parameters of the preamble in accordance with one or more boosted power levels in accordance with a threshold power level value for the data rate.

FIG. 11 shows a flowchart illustrating an example process 1100 performable at a wireless STA that supports ELR wireless packet design. The operations of the process 1100 may be an example of a method implemented by a wireless STA or its components as described herein. For example, the process 1100 may be performed by a wireless communication device, such as the wireless communication device 900 described with reference to FIG. 9, operating as or within a wireless STA. In some implementations, the process 1100 may be performed by a wireless STA, such as one of the STAs 104 described with reference to FIG. 1.

In some implementations, in block 1105, the wireless STA may receive an indication to transmit an ELR wireless packet comprising a preamble and a data field, the ELR wireless packet associated with a frequency band that is at least 2.4 GHz or higher in a frequency domain and associated with OFDM communications. The operations of block 1105 may be performed in accordance with examples as disclosed herein. In some implementations, aspects of the operations of block 1105 may be performed by a CTS manager 925 as described with reference to FIG. 9.

In some implementations, in block 1110, the wireless STA may transmit, in accordance with the indication and a data rate associated with ELR communications, the extended long range wireless packet using one or more power levels for one or more respective fields of the preamble and a first numerical quantity of repetitions for at least one field of the preamble, the one or more power levels and the first numerical quantity of repetitions dedicated to the ELR communications, the data rate less than a threshold data rate associated with second communications different than the ELR communications. The operations of block 1110 may be performed in accordance with examples as disclosed herein. In some implementations, aspects of the operations of block 1110 may be performed by an ELR wireless packet manager 930 as described with reference to FIG. 9.

Figure 12:
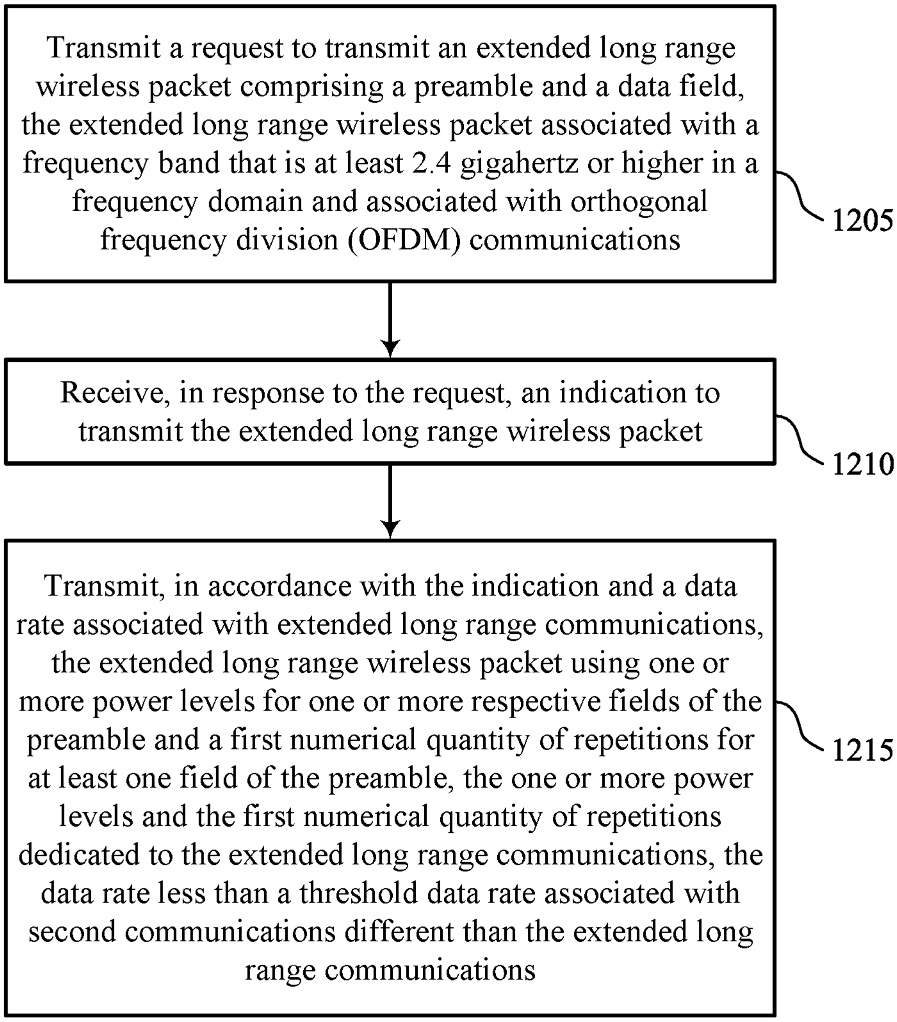

FIG. 12 shows a flowchart illustrating an example process 1200 performable at a wireless STA that supports ELR wireless packet design. The operations of the process 1200 may be an example of a method implemented by a wireless STA or its components as described herein. For example, the process 1200 may be performed by a wireless communication device, such as the wireless communication device 900 described with reference to FIG. 9, operating as or within a wireless STA. In some implementations, the process 1200 may be performed by a wireless STA, such as one of the STAs 104 described with reference to FIG. 1.

In some implementations, in block 1205, the wireless STA may transmit a request to transmit an ELR wireless packet including a preamble and a data field, the ELR wireless packet associated with a frequency band that is at least 2.4 GHz or higher in a frequency domain and associated with OFDM communications. The operations of block 1205 may be performed in accordance with examples as disclosed herein. In some implementations, aspects of the operations of block 1205 may be performed by an ELR wireless packet manager 930 as described with reference to FIG. 9.

In some implementations, in block 1210, the wireless STA may receive, in response to the request, an indication to transmit the ELR wireless packet. The operations of block 1205 may be performed in accordance with examples as disclosed herein. In some implementations, aspects of the operations of block 1210 may be performed by a CTS manager 925 as described with reference to FIG. 9.

In some implementations, in block 1215, the wireless STA may transmit, in accordance with the indication and a data rate associated with ELR communications, the ELR wireless packet using one or more power levels for one or more respective fields of the preamble and a first numerical quantity of repetitions for at least one field of the preamble, the one or more power levels and the first numerical quantity of repetitions dedicated to the ELR communications, the data rate less than a threshold data rate associated with second communications different than the ELR communications. The operations of block 1215 may be performed in accordance with examples as disclosed herein. In some implementations, aspects of the operations of block 1215 may be performed by an ELR wireless packet manager 930 as described with reference to FIG. 9.

FIG. 13 shows a flowchart illustrating an example process 1300 performable at a wireless STA that supports ELR wireless packet design. The operations of the process 1300 may be an example of a method implemented by a wireless STA or its components as described herein. For example, the process 1300 may be performed by a wireless communication device, such as the wireless communication device 900 described with reference to FIG. 9, operating as or within a wireless STA. In some implementations, the process 1300 may be performed by a wireless STA, such as one of the STAs 104 described with reference to FIG. 1.

In some implementations, in block 1305, the wireless STA may transmit, in accordance with a data rate associated with ELR communications and via a frequency band that is at least 2.4 GHz or higher in a frequency domain, an ELR wireless packet that includes a preamble and a data field, the preamble including an STF, an LTF, or both dedicated to the ELR communications, a duration of the STF associated with detection of the ELR wireless packet and an AGC for the ELR wireless packet, the preamble and the data field of the ELR wireless packet associated with a first bandwidth that is less than a threshold bandwidth for the ELR communications. The operations of block 1305 may be performed in accordance with examples as disclosed herein. In some implementations, aspects of the operations of block 1305 may be performed by an ELR wireless packet manager 930 as described with reference to FIG. 9.

FIG. 14 shows a flowchart illustrating an example process 1400 performable at a wireless STA that supports ELR wireless packet design. The operations of the process 1400 may be an example of a method implemented by a wireless STA or its components as described herein. For example, the process 1400 may be performed by a wireless communication device, such as the wireless communication device 900 described with reference to FIG. 9, operating as or within a wireless STA. In some implementations, the process 1400 may be performed by a wireless STA, such as one of the STAs 104 described with reference to FIG. 1.

In some implementations, in block 1405, the wireless STA may receive signaling that triggers transmission of an ELR wireless packet that includes a preamble and a data field, the preamble including an STF, an LTF, or both dedicated to the ELR communications, a duration of the STF associated with detection of the ELR wireless packet and an AGC for the ELR wireless packet, the preamble and the data field of the ELR wireless packet associated with a first bandwidth that is less than a threshold bandwidth for the ELR communications. The operations of block 1405 may be performed in accordance with examples as disclosed herein. In some implementations, aspects of the operations of block 1405 may be performed by a trigger frame manager 950 as described with reference to FIG. 9.

In some implementations, in block 1410, the wireless STA may transmit, in accordance with the signaling, a data rate associated with ELR communications and via a frequency band that is at least 2.4 GHz or higher in a frequency domain, the ELR wireless packet. The operations of block 1410 may be performed in accordance with examples as disclosed herein. In some implementations, aspects of the operations of block 1405 may be performed by an ELR wireless packet manager 930 as described with reference to FIG. 9.

Figure 15:
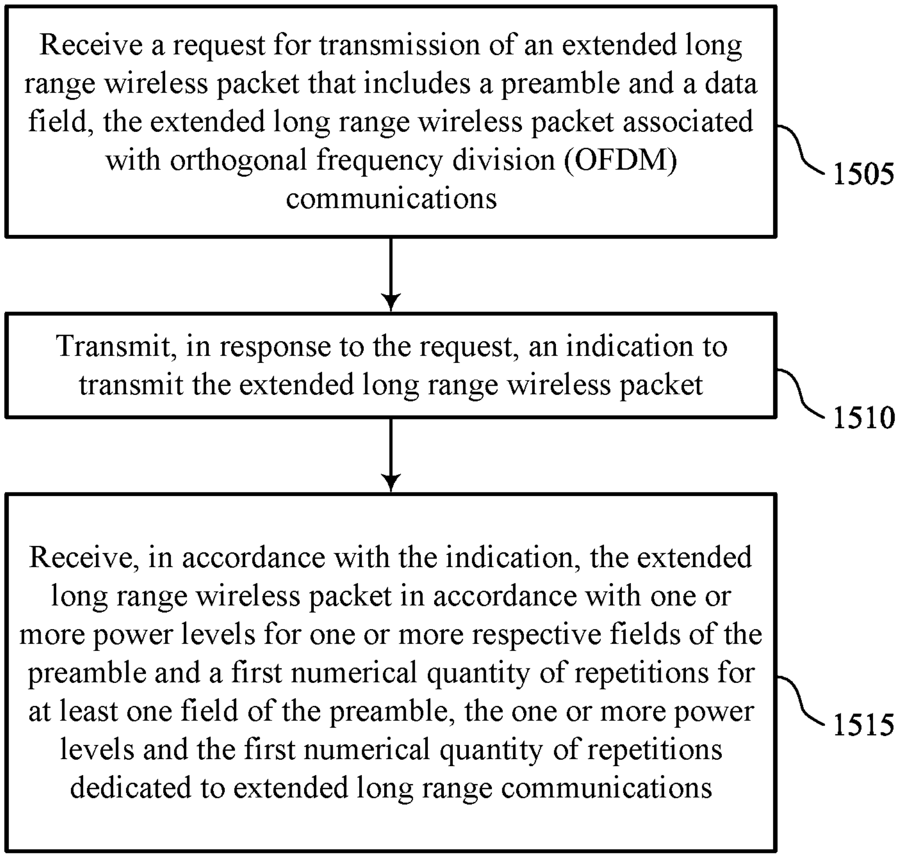

FIG. 15 shows a flowchart illustrating an example process 1500 performable at a wireless AP that supports ELR wireless packet design. The operations of the process 1500 may be an example of a method implemented by a wireless AP or its components as described herein. For example, the process 1500 may be performed by a wireless communication device, such as the wireless communication device 1000 described with reference to FIG. 10, operating as or within a wireless AP. In some implementations, the process

1500 may be performed by a wireless AP, such as one of the APs 102 described with reference to FIG. 1.

In some implementations, in block 1505, the wireless AP may receive a request for transmission of an ELR wireless packet that includes a preamble and a data field, the ELR wireless packet associated with OFDM communications. The operations of block 1505 may be performed in accordance with examples as disclosed herein. In some implementations, aspects of the operations of block 1505 may be performed by an RTS manager 1025 as described with reference to FIG. 10.

In some implementations, in block 1510, the wireless AP may transmit, in response to the request, an indication to transmit the ELR wireless packet. The operations of block 1510 may be performed in accordance with examples as disclosed herein. In some implementations, aspects of the operations of block 1510 may be performed by a CTS manager 1030 as described with reference to FIG. 10.

In some implementations, in block 1515, the wireless AP may receive, in accordance with the indication, the ELR wireless packet in accordance with one or more power levels for one or more respective fields of the preamble and a first numerical quantity of repetitions for at least one field of the preamble, the one or more power levels and the first numerical quantity of repetitions dedicated to ELR communications. The operations of block 1515 may be performed in accordance with examples as disclosed herein. In some implementations, aspects of the operations of block 1515 may be performed by an ELR wireless packet manager 1035 as described with reference to FIG. 10.

FIG. 16 shows a flowchart illustrating an example process 1600 performable at a wireless AP that supports ELR wireless packet design. The operations of the process 1600 may be an example of a method implemented by a wireless AP or its components as described herein. For example, the process 1600 may be performed by a wireless communication device, such as the wireless communication device 1000 described with reference to FIG. 10, operating as or within a wireless AP. In some implementations, the process 1600 may be performed by a wireless AP, such as one of the APs 102 described with reference to FIG. 1.

In some implementations, in block 1605, the wireless AP may receive, in accordance with a data rate associated with ELR communications, an ELR wireless packet that includes a preamble and a data field, the preamble including an STF, an LTF, or both dedicated to the ELR communications, a duration of the STF associated with detection of the ELR wireless packet and an AGC of the ELR wireless packet. The operations of block 1605 may be performed in accordance with examples as disclosed herein. In some implementations, aspects of the operations of block 1605 may be performed by a power boosting manager 1040 as described with reference to FIG. 10.

FIG. 17 shows a flowchart illustrating an example process 1700 performable at a wireless AP that supports ELR wireless packet design. The operations of the process 1700 may be an example of a method implemented by a wireless AP or its components as described herein. For example, the process 1700 may be performed by a wireless communication device, such as the wireless communication device 1000 described with reference to FIG. 10, operating as or within a wireless AP. In some implementations, the process 1700 may be performed by a wireless AP, such as one of the APs 102 described with reference to FIG. 1.

In some implementations, in block 1705, the wireless AP may transmit signaling that triggers transmission of an ELR wireless packet that includes a preamble and a data field, the ELR wireless packet associated with OFDM communications. The operations of block 1705 may be performed in accordance with examples as disclosed herein. In some implementations, aspects of the operations of block 1705 may be performed by a trigger frame manager 1045 as described with reference to FIG. 10.

In some other implementations, the wireless AP may not transmit the signaling that triggers the transmission of the ELR wireless packet.

In some implementations, in block 1710, the wireless AP may receive, in accordance with the signaling, the ELR wireless packet using a first bandwidth for the preamble and the data field, the first bandwidth dedicated to ELR communications. The operations of block 1710 may be performed in accordance with examples as disclosed herein. In some implementations, aspects of the operations of block 1710 may be performed by a narrow bandwidth manager 1050 as described with reference to FIG. 10.

The following provides an overview of aspects of the present disclosure:

Aspect 1: A method for wireless communication at a wireless STA, comprising: receiving an indication to transmit an ELR wireless packet comprising a preamble and a data field, the ELR wireless packet associated with a frequency band that is at least 2.4 GHz or higher in a frequency domain and associated with OFDM communications; and transmitting, in accordance with the indication and a data rate associated with ELR communications, the ELR wireless packet using one or more power levels for one or more respective fields of the preamble and a first numerical quantity of repetitions for at least one field of the preamble, the one or more power levels and the first numerical quantity of repetitions dedicated to the ELR communications, the data rate less than a threshold data rate associated with second communications different than the ELR communications.

Aspect 2: The method of aspect 1, further comprising: transmitting a request to transmit the ELR wireless packet, the indication being received in response to transmitting the request.

Aspect 3: The method of aspect 1, further comprising: transmitting a request to transmit the ELR wireless packet, a duration of the request associated at least in part with the ELR communications; and receiving the indication in response to the request, the indication comprising a trigger frame that indicates protection for the ELR wireless packet, the ELR wireless packet comprising a trigger-based transmission associated at least in part with the trigger frame.

Aspect 4: The method of aspect 3, further comprising: transmitting, via the request to transmit the ELR wireless packet, an identifier of the wireless STA, information associated with a basic service set, a duration for the protection for the ELR wireless packet, or any combination thereof.

Aspect 5: The method of any of aspects 3 through 4, further comprising: transmitting the request via a wireless packet comprising at least a STF, a LTF, and a signal field.

Aspect 6: The method of any of aspects 1 through 5, further comprising: applying a CFO to the at least one field of the preamble, the CFO associated at least in part with the indication.

Aspect 7: The method of any of aspects 1 through 5, further comprising: transmitting, via the at least one field of the preamble, a signature sequence, the signature sequence associated at least in part with the indication.

Aspect 8: The method of any of aspects 1 through 5, wherein the first numerical quantity of repetitions for the at least one field of the preamble is at least four repetitions, the at least one field comprising a signal field.

Aspect 9: The method of aspect 8, wherein each repetition of the at least four repetitions comprises a subset of a set of bits associated at least in part with an indication of the ELR communications.

Aspect 10: The method of any of aspects 1 through 9, further comprising: transmitting the data field in accordance with a second numerical quantity of repetitions, an interleaving parameter, a code rate, a modulation scheme, or any combination thereof, the second numerical quantity of repetitions, the interleaving parameter, the code rate, and the modulation scheme associated with the data rate.

Aspect 11: The method of aspect 10, wherein the modulation scheme comprises an MCS0 and the second numerical quantity of repetitions comprises four repetitions or the second numerical quantity of repetitions comprises three repetitions.

Aspect 12: The method of any of aspects 1 through 11, further comprising: boosting the one or more power levels in accordance with a threshold power level value for the data rate.

Aspect 13: The method of any of aspects 1 through 12, wherein the one or more respective fields comprise a STF, a LTF, or both.

Aspect 14: The method of any of aspects 1 through 13, wherein the at least one field comprises one or more signal fields that indicate whether the ELR wireless packet is for a single user or not, coding information, a length of the ELR wireless packet, a MCS, a bandwidth size, a resource unit size, or any combination thereof.

Aspect 15: A method for wireless communication at a wireless STA, comprising: transmitting, in accordance with a data rate associated with ELR communications and via a frequency band that is at least 2.4 GHz or higher in a frequency domain, an ELR wireless packet that comprises a preamble and a data field, the preamble comprising a STF, a LTF, or both dedicated to the ELR communications, a duration of the STF associated with detection of the ELR wireless packet and an automatic gain control for the ELR wireless packet, the preamble and the data field of the ELR wireless packet associated with a first bandwidth that is less than a threshold bandwidth for the ELR communications.

Aspect 16: The method of aspect 15, further comprising: transmitting the STF, the LTF, or both in accordance with respective boosted power levels, the respective boosted power levels associated with a threshold power level value for the data rate.

Aspect 17: The method of any of aspects 15 through 16, further comprising: receiving signaling that triggers transmission of the ELR wireless packet, the ELR wireless packet transmitted in accordance with the signaling.

Aspect 18: The method of any of aspects 15 through 17, further comprising: transmitting the ELR wireless packet in accordance with a downclocking ratio that downclocks a bandwidth of the ELR wireless packet from a second bandwidth to the first bandwidth.

Aspect 19: The method of aspect 18, wherein the ELR wireless packet is associated with OFDM communications; and the OFDM communications comprise a plurality of ELR wireless packets comprising the ELR wireless packet in accordance with the plurality of ELR wireless packets being associated with the downclocking ratio.

Aspect 20: The method of any of aspects 18 through 19, further comprising: transmitting the ELR wireless packet in accordance with a numerical quantity of repetitions in frequency associated with a target coverage range corresponding to the ELR communications.

Aspect 21: The method of any of aspects 18 through 20, further comprising: selecting the downclocking ratio in accordance with a CFO correction value satisfying a threshold CFO correction value, a range gain value satisfying a threshold range gain value, or both.

Aspect 22: The method of any of aspects 18 through 21, further comprising: transmitting the preamble in accordance with an increased frequency spacing between one or more resources of at least one field of one or more fields of the preamble in accordance with a CFO correction value failing to satisfy a threshold CFO correction value.

Aspect 23: The method of any of aspects 15 through 22, further comprising: selecting the first bandwidth for the data field in accordance with a resource unit size corresponding to the preamble and the data field.

Aspect 24: The method of aspect 23, wherein the ELR wireless packet is associated with OFDM communications; and the OFDM communications comprise the ELR wireless packet and a plurality of wireless packets in accordance with the resource unit size and a tone plan associated with the ELR wireless packet and the plurality of wireless packets.

Aspect 25: The method of any of aspects 23 through 24, wherein the preamble indicates whether the ELR wireless packet is for a single user or not, coding information, a length of the ELR wireless packet, a MCS, a bandwidth size, the resource unit size, or any combination thereof.

Aspect 26: The method of any of aspects 23 through 25, wherein one or more fields of the preamble are repeated in accordance with a tone plan and a duration in accordance with the resource unit size, the tone plan associated with one or more resource indices for repetitions of the one or more fields of the preamble.

Aspect 27: The method of any of aspects 15 through 26, wherein the preamble comprises a STF dedicated to the ELR communications, a tone spacing associated with the STF associated at least in part with the ELR communications.

Aspect 28: An apparatus for wireless communication at a STA, comprising: a processing system that includes one or more processors and one or more memories coupled with the one or more processors, the processing system configured to cause the apparatus to perform a method of any of aspects 1 through 14.

Aspect 29: A wireless STA for wireless communication, comprising at least one means for performing a method of any of aspects 1 through 14.

Aspect 30: A non-transitory computer-readable medium storing code for wireless communication, the code comprising instructions executable by a processor to perform a method of any of aspects 1 through 14.

Aspect 31: An apparatus for wireless communication at a STA, comprising: a processing system that includes one or more processors and one or more memories coupled with the one or more processors, the processing system configured to cause the apparatus to perform a method of any of aspects 15 through 27.

Aspect 32: A STA for wireless communication, comprising at least one means for performing a method of any of aspects 15 through 27.

Aspect 33: A non-transitory computer-readable medium storing code for wireless communication, the code comprising instructions executable by a processor to perform a method of any of aspects 15 through 27.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrases "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b.

As used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

The various illustrative components, logic, logical blocks, modules, circuits, operations and algorithm processes described in connection with the examples disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some implementations be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. An apparatus for wireless communications at a wireless station, comprising:

a processing system that includes one or more processors and one or more memories coupled with the one or more processors, the processing system configured to cause the apparatus to:

receive an indication to transmit an extended long range (ELR) wireless packet comprising a preamble and a data field, the ELR wireless packet associated with a frequency band that is at least 2.4 gigahertz or higher in a frequency domain and associated with orthogonal frequency division (OFDM) communications; and transmit, in accordance with the indication and a data rate associated with ELR communications, the ELR wireless packet including the preamble and the data field, the preamble including single legacy short training field (STF) (L-STF), a single legacy long training field (LTF) (L-LTF), a single legacy signal (SIG) field (L-SIG), a single repeat of the L-SIG field (RL-SIG), a single universal SIG field (U-SIG), a single ELR STF (ELR-STF), one or more ELR LTFs (ELR-LTFs), and an ELR SIG field (ELR-SIG) that is repeated 4 times in the time domain, the data field also being repeated 4 times in the time domain, the data rate being less than a minimum data rate used for a legacy version of an Institute of Electrical and Electronics Engineers (IEEE) 802.11 standard, and the L-STF and L-LTF being transmitted with a higher power than that used for the other fields of the preamble.

2. The apparatus of claim 1, wherein the processing system is further configured to cause the apparatus to:

transmit a request to transmit the ELR wireless packet, the indication being received in response to transmitting the request.

3. The apparatus of claim 1, wherein the processing system is further configured to cause the apparatus to:

transmit a request to transmit the ELR wireless packet, a duration of the request associated at least in part with the ELR communications; and receive the indication in response to the request, the indication comprising a trigger frame that indicates protection for the ELR wireless packet, the extended long range wireless packet comprising a trigger-based transmission associated at least in part with the trigger frame.

4. The apparatus of claim 3, wherein the processing system is further configured to cause the apparatus to:

transmit, via the request to transmit the ELR wireless packet, an identifier of the wireless station, information associated with a basic service set, a duration for the protection for the ELR wireless packet, or any combination thereof.

5. The apparatus of claim 3, wherein the processing system is further configured to cause the apparatus to:

transmit the request via a wireless packet comprising at least a short training field, a long training field, and a signal field.

6. The apparatus of claim 1, wherein the processing system is further configured to cause the apparatus to:

apply a carrier frequency offset to the preamble, the carrier frequency offset associated at least in part with the indication.

7. The apparatus of claim 1, wherein the processing system is further configured to cause the apparatus to:

transmit, via a field of the preamble, a signature sequence that is unique to ELR communications, the signature sequence associated at least in part with the indication.

8. The apparatus of claim 1, wherein the processing system is further configured to cause the apparatus to:

transmit the data field in accordance with an interleaving parameter, a code rate, a modulation scheme, or any combination thereof, the interleaving parameter, the code rate, and the modulation scheme associated with the data rate.

9. The apparatus of claim 8, wherein the modulation scheme comprises a modulation and coding scheme 0 (MCS0).

10. The apparatus of claim 1, wherein one or more fields of the preamble indicate whether the ELR wireless packet is for a single user or not, coding information, a length of the ELR wireless packet, a modulation and coding scheme (MCS), a bandwidth size, a resource unit size, or any combination thereof.

11. An apparatus for wireless communications at a wireless station, comprising:

a processing system that includes one or more processors and one or more memories coupled with the one or more processors, the processing system configured to cause the apparatus to:

transmit, in accordance with a data rate associated with extended long range (ELR) communications, and via a frequency band that is at least 2.4 gigahertz or higher in a frequency domain, an (ELR) wireless packet that comprises a preamble and a data field, the preamble comprising a short training field, a long training field, or both dedicated to the (ELR) communications, a duration of the short training field associated with detection of the (ELR) wireless packet and an automatic gain control for the (ELR) wireless packet, the preamble and the data field of the (ELR) wireless packet being transmitted via a first bandwidth that is less than a threshold bandwidth for the (ELR) communications, the first bandwidth being in accordance with a downclocking ratio that is associated with a downclocking of a bandwidth of the ELR wireless packet from a second bandwidth to the first bandwidth.

12. The apparatus of claim 11, wherein the processing system is further configured to cause the apparatus to:

transmit the short training field, the long training field, or both in accordance with respective boosted power levels, the respective boosted power levels associated with a threshold power level value for the data rate.

13. The apparatus of claim 11, wherein the processing system is further configured to cause the apparatus to:

receive signaling that triggers transmission of the (ELR) wireless packet, the (ELR) wireless packet transmitted in accordance with the signaling.

14. The apparatus of claim 11, wherein:

the (ELR) wireless packet is associated with orthogonal frequency division (OFDM) communications; and the OFDM communications comprise a plurality of (ELR) wireless packets comprising the (ELR) wireless packet, the plurality of (ELR) wireless packets being associated with the downclocking ratio.

15. The apparatus of claim 11, wherein the processing system is further configured to cause the apparatus to:

transmit the (ELR) wireless packet in accordance with a numerical quantity of repetitions in frequency associated with a target coverage range corresponding to the (ELR) communications.

16. The apparatus of claim 11, wherein the processing system is further configured to cause the apparatus to:

select the downclocking ratio in accordance with a carrier frequency offset correction value satisfying a threshold carrier frequency offset correction value, a range gain value satisfying a threshold range gain value, or both.

17. The apparatus of claim 11, wherein the processing system is further configured to cause the apparatus to:

transmit the preamble in accordance with an increased frequency spacing between one or more resources of at least one field of one or more fields of the preamble in accordance with a carrier frequency offset correction value failing to satisfy a threshold carrier frequency offset correction value.

18. The apparatus of claim 11, wherein the processing system is further configured to cause the apparatus to:

select the first bandwidth for the data field in accordance with a resource unit size corresponding to the preamble and the data field.

19. The apparatus of claim 18, wherein:

the (ELR) wireless packet is associated with orthogonal frequency division (OFDM) communications; and the OFDM communications comprise the (ELR) wireless packet and a plurality of wireless packets in accordance with the resource unit size and a tone plan associated with the (ELR) wireless packet and the plurality of wireless packets.

20. The apparatus of claim 18, wherein the preamble indicates whether the (ELR) wireless packet is for a single user or not, coding information, a length of the (ELR) wireless packet, a modulation and coding scheme (MCS), a bandwidth size, the resource unit size, or any combination thereof.

21. The apparatus of claim 18, wherein one or more fields of the preamble are repeated in accordance with a tone plan and a duration in accordance with the resource unit size, the tone plan associated with one or more resource indices for repetitions of the one or more fields of the preamble.

22. The apparatus of claim 11, wherein the preamble comprises the short training field dedicated to the (ELR) communications, and a tone spacing associated with the short training field is associated at least in part with the (ELR) communications.

23. A method for wireless communication at a wireless station, comprising:

receiving an indication to transmit an extended long range (ELR) wireless packet comprising a preamble and a data field, the ELR wireless packet associated with a frequency band that is at least 2.4 gigahertz or higher in a frequency domain and associated with orthogonal frequency division (OFDM) communications; and transmitting, in accordance with the indication and a data rate associated with ELR communications, the ELR wireless packet including the preamble and the data field, the preamble including single legacy short training field (STF) (L-STF), a single legacy long training field (LTF) (L-LTF), a legacy signal (SIG) field (L-SIG), a single repeat of the L-SIG field (RL-SIG), a universal SIG field (U-SIG), a single ELR STF (ELR-STF), one or more ELR LTFs (ELR-LTFs), and an ELR SIG field (ELR-SIG) that is repeated 4 times in the time domain, the data field also being repeated 4 times in the time domain, the data rate being less than a minimum data rate used for a legacy version of an Institute of Electrical and Electronics Engineers (IEEE) 802.11 standard, and the L-STF and L-LTF being transmitted with a higher power than that used for the other fields of the preamble.

24. The method of claim 23, further comprising:

transmitting a request to transmit the (ELR) wireless packet, the indication being received in response to transmitting the request.

25. A method for wireless communication at a wireless station, comprising:

transmitting, in accordance with a data rate associated with extended long range (ELR) communications, and via a frequency band that is at least 2.4 gigahertz or higher in a frequency domain, an (ELR) wireless packet that comprises a preamble and a data field, the preamble comprising a short training field, a long training field, or both dedicated to the (ELR) communications, a duration of the short training field associated with detection of the (ELR) wireless packet and an automatic gain control for the (ELR) wireless packet, the preamble and the data field of the (ELR) wireless packet being transmitted via a first bandwidth that is less than a threshold bandwidth for the (ELR) communications, the first bandwidth being in accordance with a downclocking ratio that is associated with a downclocking of a bandwidth of the ELR wireless packet from a second bandwidth to the first bandwidth.

* * * * *